United States Patent
Cevini et al.

(10) Patent No.: US 8,320,721 B2
(45) Date of Patent: Nov. 27, 2012

(54) OPTICAL MODE TRANSFORMER, IN PARTICULAR FOR COUPLING AN OPTICAL FIBER AND A HIGH-INDEX CONTRAST WAVEGUIDE

(75) Inventors: Gaia Cevini, Milan (IT); Paola Galli, Milan (IT); Stefano Lorenzotti, Milan (IT); Marco Piazza, Milan (IT); Marco Romagnoli, Milan (IT); Luciano Socci, Milan (IT); Lorenzo Bolla, Milan (IT); Silvia Ghidini, Milan (IT)

(73) Assignee: Google Inc., Mountain View, CA (US)

( * ) Notice: Subject to any disclaimer, the term of this patent is extended or adjusted under 35 U.S.C. 154(b) by 197 days.

(21) Appl. No.: 12/919,578

(22) PCT Filed: Feb. 29, 2008

(86) PCT No.: PCT/EP2008/052495
§ 371 (c)(1),
(2), (4) Date: Jan. 18, 2011

(87) PCT Pub. No.: WO2009/106140
PCT Pub. Date: Sep. 3, 2009

(65) Prior Publication Data
US 2011/0116741 A1    May 19, 2011

(51) Int. Cl.
*G02B 6/30* (2006.01)
(52) U.S. Cl. .............. 385/28; 385/30; 385/49; 385/14; 385/131
(58) Field of Classification Search ............ 385/27, 385/28, 29, 31, 42, 43, 49, 30, 131, 132, 385/14
See application file for complete search history.

(56) References Cited

U.S. PATENT DOCUMENTS

| 5,588,077 | A  | 12/1996 | Woodside      |
| 6,633,705 | B2 | 10/2003 | Ambrosy et al. |
| 6,697,551 | B2 | 2/2004  | Lee et al.    |

(Continued)

FOREIGN PATENT DOCUMENTS
EP    0545820 A1    6/1993
(Continued)

OTHER PUBLICATIONS

International Search Report and Written Opinion for PCT/EP2008/052495 on Jul. 10, 2008, 14 pages.
(Continued)

*Primary Examiner* — Brian Healy
(74) *Attorney, Agent, or Firm* — Honigman Miller Schwartz and Cohn LLP

(57) ABSTRACT

An optical mode transformer comprises a first waveguide including a first core, a first cladding and an end facet configured to be coupled to an optical fiber. The transformer further includes a second waveguide comprising a second core, a second cladding and an end directly coupled to an end of the first waveguide. A third waveguide comprises a third core and a third cladding, and is arranged with respect to the second waveguide so as to realize an evanescent optical coupling with the second waveguide. The third core includes a tapered region wherein evanescent coupling takes place, and wherein a refractive index contrast of the first waveguide is less than a refractive index contrast of the second waveguide, the refractive index contrast of the second waveguide is less than a refractive index contrast of the third waveguide, and the refractive index contrast of the third waveguide is not less than 18%.

20 Claims, 11 Drawing Sheets

U.S. PATENT DOCUMENTS

| | | |
|---|---|---|
| 7,099,540 B2 | 8/2006 | Shimoda |
| 2003/0053756 A1 | 3/2003 | Lam et al. |
| 2004/0037497 A1 | 2/2004 | Lee |
| 2004/0096175 A1* | 5/2004 | Tolstikhin ............ 385/131 |
| 2005/0185893 A1 | 8/2005 | Liu |
| 2006/0285797 A1 | 12/2006 | Little |
| 2007/0014519 A1 | 1/2007 | Aoki |
| 2008/0044126 A1* | 2/2008 | Costa et al. ............ 385/14 |
| 2010/0040327 A1 | 2/2010 | Deki et al. |
| 2011/0116741 A1* | 5/2011 | Cevini et al. ............ 385/28 |

FOREIGN PATENT DOCUMENTS

| | | |
|---|---|---|
| EP | 1293811 A2 | 3/2003 |
| JP | 09297235 A | 11/1997 |
| JP | 2002328244 A | 11/2002 |
| JP | 2005538426 A | 12/2005 |
| JP | 2007025145 A | 2/2007 |
| JP | 2007052328 A | 3/2007 |
| WO | WO-2004038459 A2 | 5/2004 |
| WO | WO-2008114624 A1 | 9/2008 |
| WO | 2009106140 A1 | 9/2009 |

OTHER PUBLICATIONS

Roelkens et al., "Efficient Fiber to SOI Photonic Wire Coupler Fabricated Using Standard CMOS Technology," 2005 IEEE Annual Meeting Conference Proceedings, Sydney, Australia, Oct. 23, 2005, 2 pgs.

Hardy et al, "Design and Fabrication of Mode Size Adapter in a Photosensitive Polymer Waveguide," IEEE Photonics Technology Letters, IEEE, May 1, 2005, 4 pgs.

Mashayekhi et al., "Semiconductor Device to Optical Fiber Coupling Using Low-Loss Glass Taper Waveguide," Optical Engineering, Society of Photo-Optical Instrumentation Engineers, Bellingham, vol. 36, No. 12, Dec. 1, 1997, 2 pgs.

Costa et al, "TE-TM Coupling of a Standard Fiber to a Si-Wire Waveguide," European Conference on Integrated Optics (ECIO), Copenhagen, Denmark, Apr. 25-27, 2007, 4 pgs.

Japanese Office Action for application 2010-547965 dated May 8, 2012.

* cited by examiner

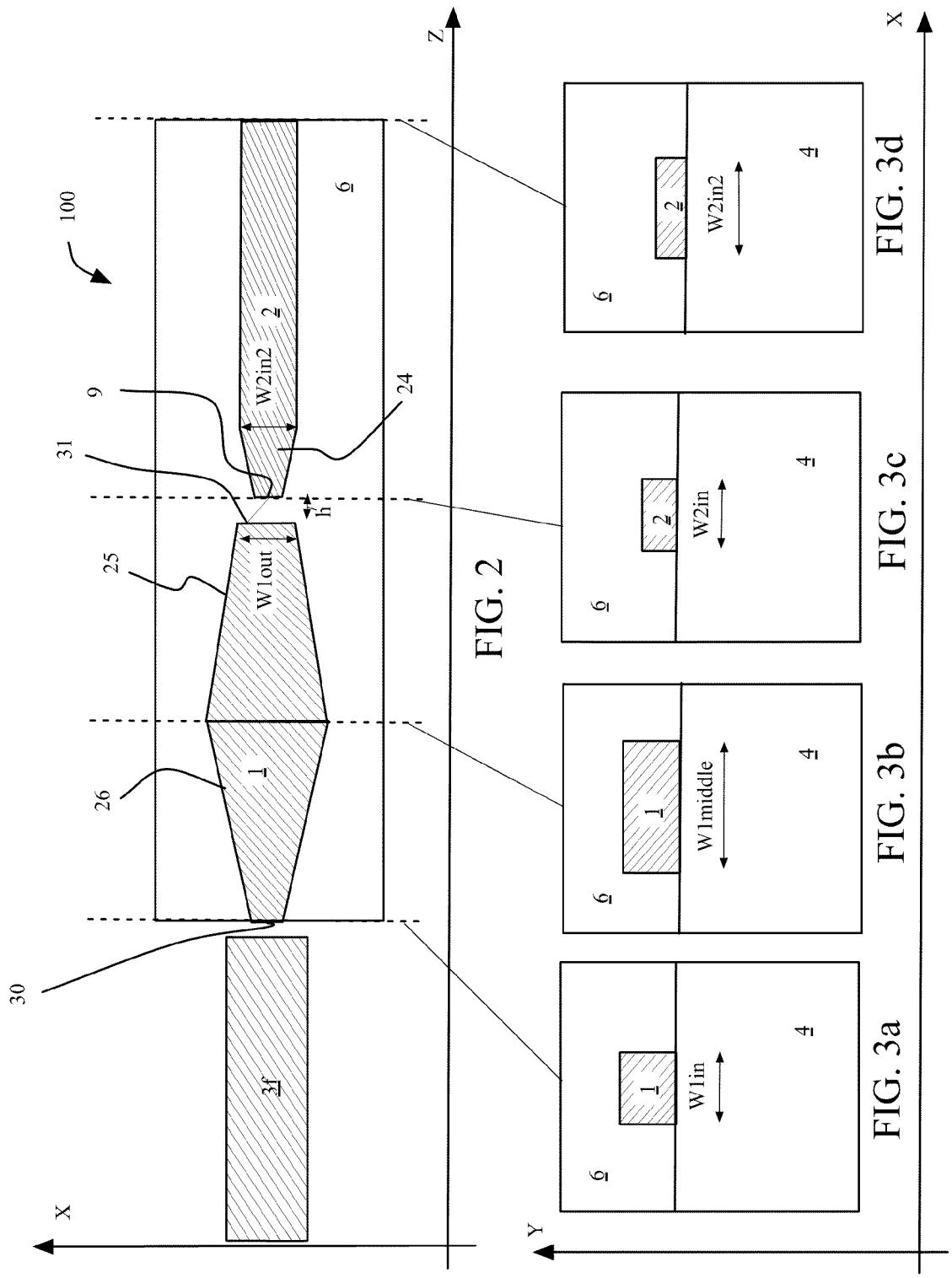

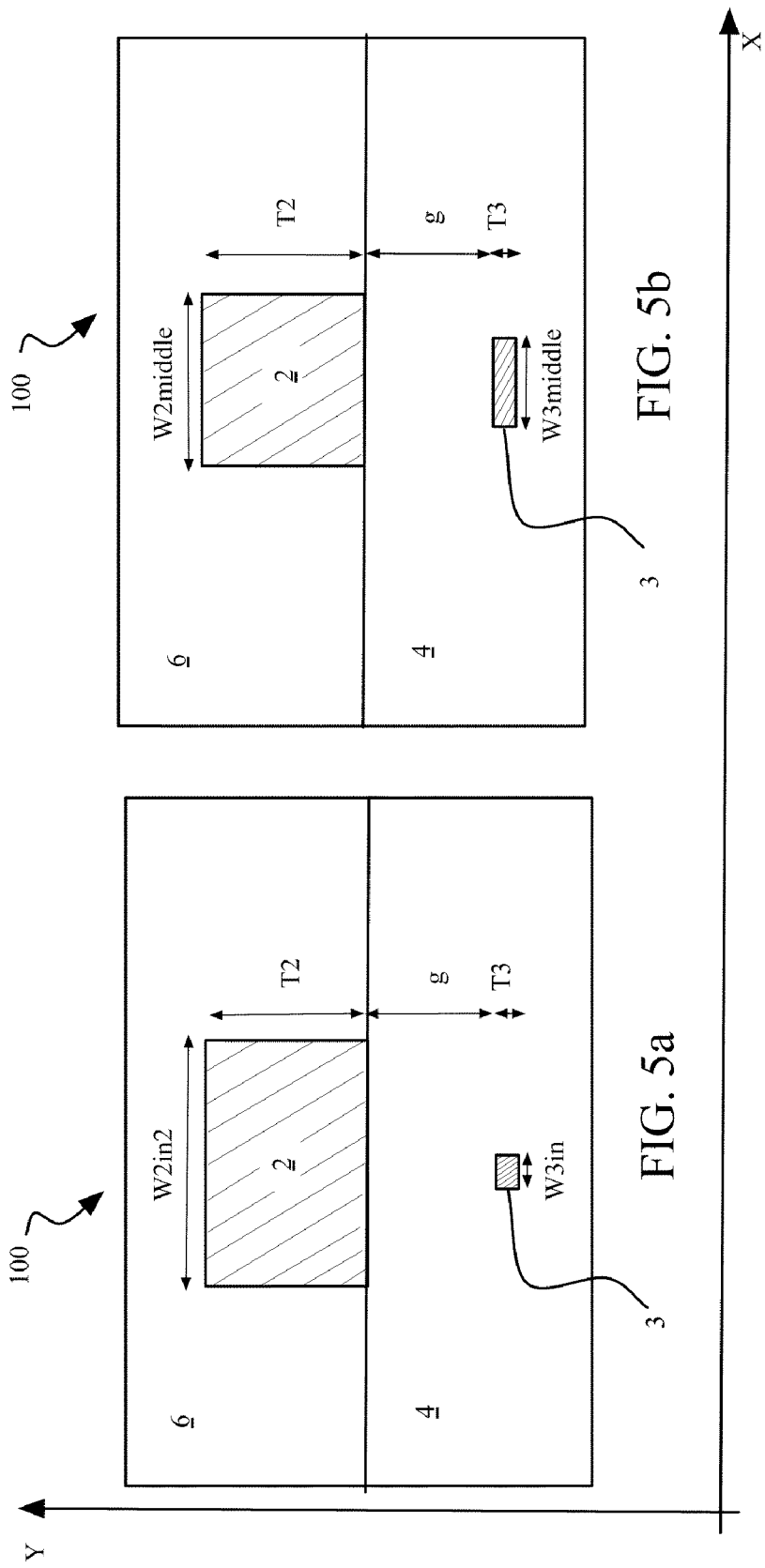

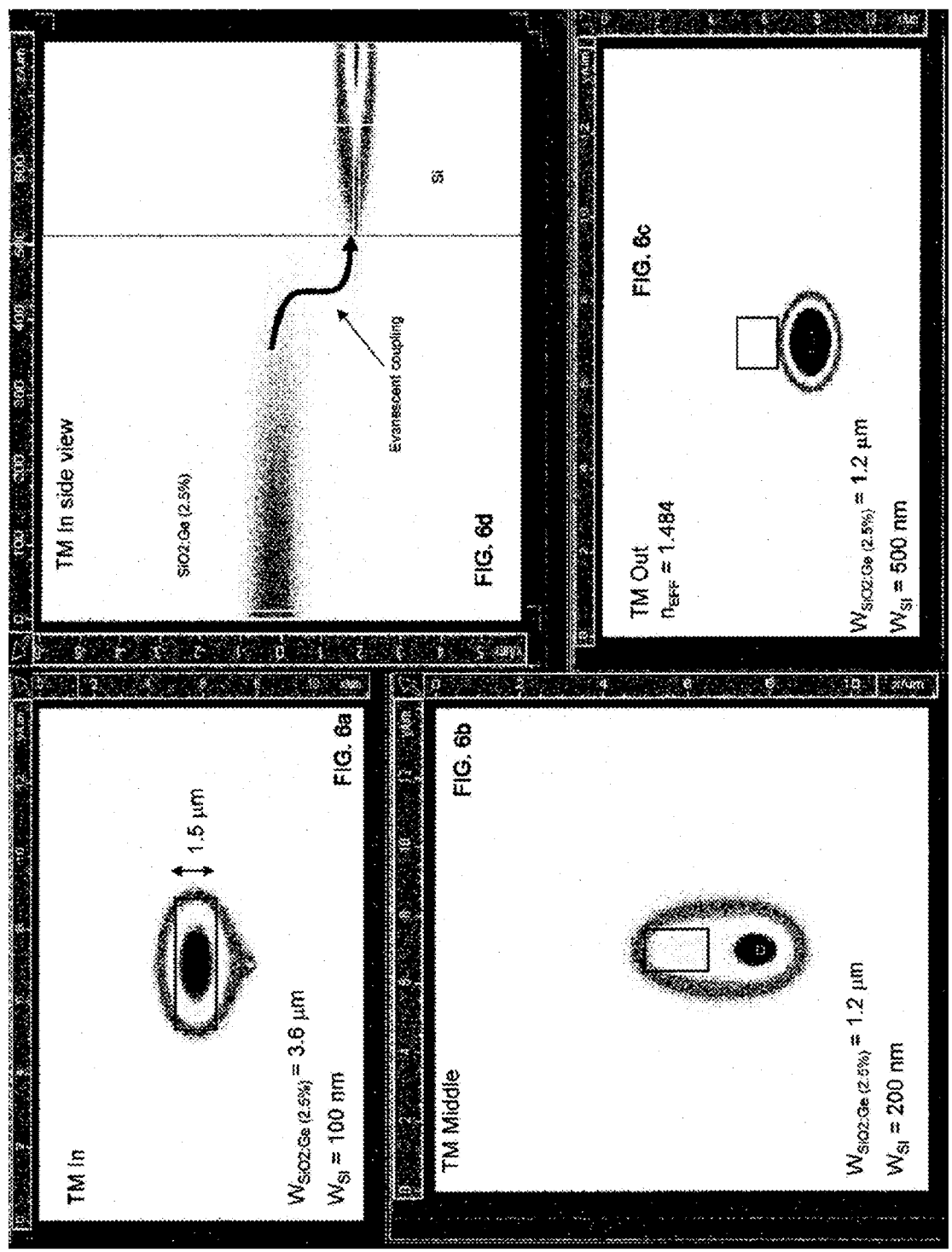

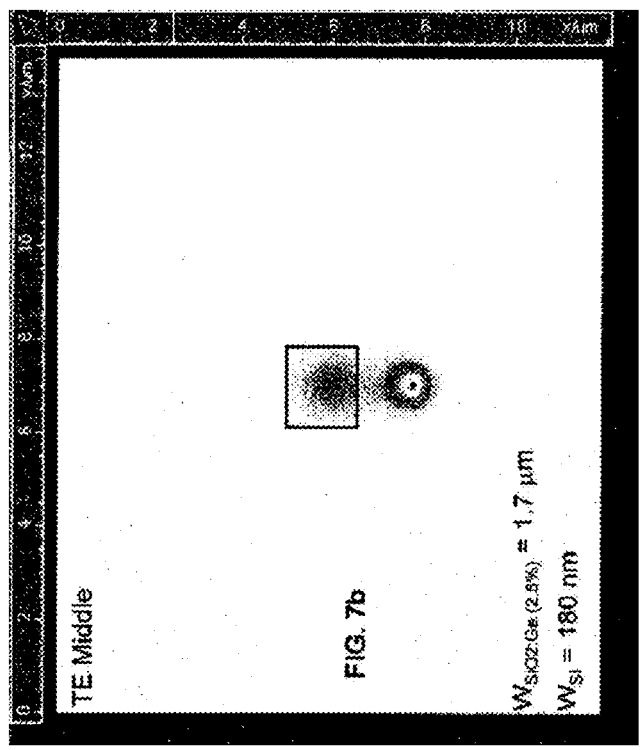
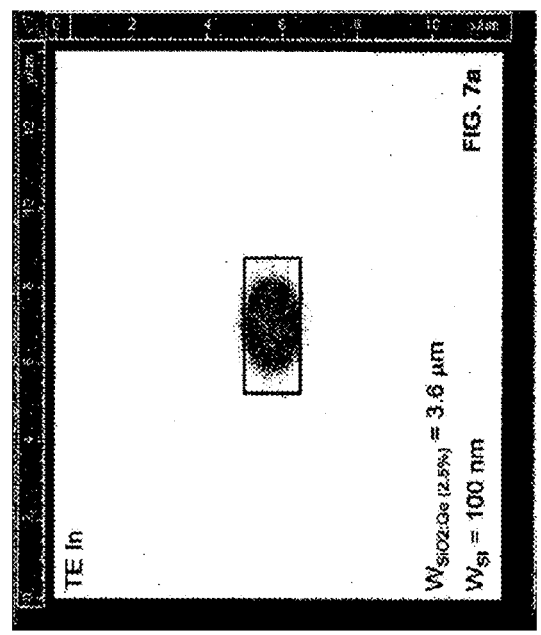
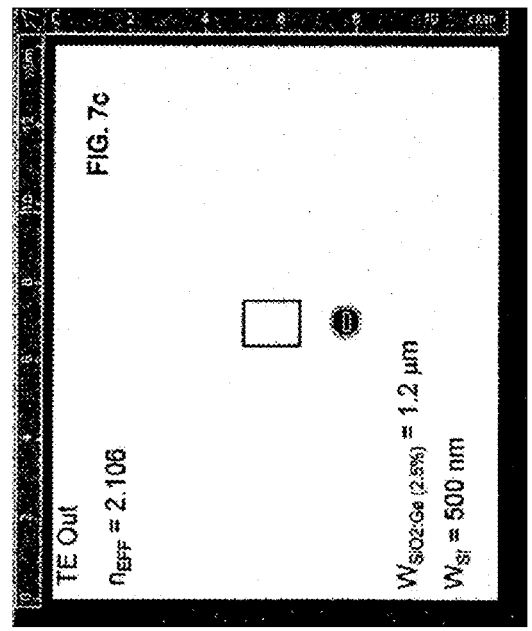

OPTICAL MODE TRANSFORMER, IN PARTICULAR FOR COUPLING AN OPTICAL FIBER AND A HIGH-INDEX CONTRAST WAVEGUIDE

TECHNICAL FIELD

The present invention relates to an optical mode transformer for efficiently coupling a single mode optical fiber to a high index contrast waveguide. In particular, the transformer of the invention is designed to minimize overall optical losses.

TECHNOLOGICAL BACKGROUND

The present invention relates to the field of semiconductor and dielectric optical components and devices used for optical transmission or optical digital data processing, in particular to the field of optical mode transformers between two waveguides.

One of the problems of the so called "Silicon Photonics" is the efficient coupling of high-contrast index waveguide, such as Si-waveguides, to the standard single mode optical fiber. Typically, a standard single-mode fiber has a mode field diameter comprised between 8 and 12 µm, more typically of 9-10 µm. The reason of the aforementioned problem lies in the difference in mode size, as well as in the refractive index, between the optical fiber and the Si waveguide.

The difference in mode size prevents to directly connect the single mode fiber to the high-index contrast waveguide, for example through a butt coupling, because the coupling can give rise to a high power loss, due to the difference in the mode size, the latter being typically of at least an order of magnitude.

The difference in refractive index causes a mode velocity difference between the waveguide and the fiber, resulting again in a high coupling loss when a direct coupling is performed.

To enable an efficient coupling between such different optical modes, optical mode converters, known also as optical mode transformers, are made in order to reshape the mode of the optical signal coming from the waveguide/optical fiber and to make its profile compatible with that of the mode guided in the optical fiber/waveguide in which the optical signal should be coupled. This mode matching should be done while preserving the performance characteristics of the optical device, e.g., by keeping the power losses caused by the optical coupling between the waveguide and the fiber below a certain reasonable level.

There have been several approaches to achieve efficient coupling between two different waveguides or waveguide/fiber with different refractive indices.

A known approach is to provide the high-index contrast waveguide with a taper.

U.S. Pat. No. 6,633,705 in the name of Alcatel discloses an optical module which contains at least one optical component whose optical input/output is directed towards an optical fiber to which it is to be coupled. At least one additional optical waveguide is arranged between this optical component and the optical fiber. The optical component is provided with an optical waveguide whose end, facing towards the optical fiber, is tapered or widened for a mode field adaptation. Additionally, the end of each interposed optical waveguide facing towards the optical fiber is also tapered or widened for a modal field adaptation.

US patent application n. 2006/0285797 describes an integrated optical mode transformer which provides a low loss interconnection between an optical fiber and an integrated optic waveguide having a spot size different from that of the fiber. The mode transformer is comprised of two waveguide layers, an upper layer and a lower layer. With the upper layer being contiguous to the lower layer. The lower layer is the integrated optic waveguide layer forming the optical circuit. The input dimension of the composite two-waveguide structure supports a fundamental mode that accepts all of the light present in the optical fiber. The upper waveguide layer is tapered down from an input width to an output width and then terminates in such a way that at the termination substantially all of the input optical power resides in the lower waveguide layer. The two-waveguide layer structure is fabricated by deposition and planarization techniques.

U.S. Pat. No. 6,697,551 in the name of the Massachusetts Institute of Technology is relative to a mode transformer that enables low-loss coupling between optical modes of two waveguides with different index difference. The mode size and effective index are gradually changed between two waveguides to gradually transform the mode shape, size and speed with minimum power loss. The mode transformer is useful for coupling the mode of an optical fiber waveguide with low index difference to the mode of a planar high index difference waveguide, and vice versa.

A different approach is disclosed in U.S. Pat. No. 7,099,540 in the name of NEC Corporation, where an optical coupling device is disclosed, having an optical waveguide varied in difference in specific refractive index between a clad layer and a core layer. The optical waveguide serves as a convergent/divergent spot size converter, since reduction in cross section of the core layer is not required for the convergent/divergent spot size converter so that the optical coupling device is produced at high production yield.

US patent application No. 2005/0185893 describes an apparatus and a method for reducing a mode size of an optical beam. In one embodiment of the described solution, the apparatus includes a first optical waveguide disposed in a first semiconductor material of a semiconductor layer. The first optical waveguide includes an inverted tapered inner core disposed in an untapered outer core of the first optical waveguide. The inverted tapered inner core includes a smaller end and a larger end.

The apparatus further includes a second optical waveguide disposed in a second semiconductor material of the semiconductor layer. The second optical waveguide is a tapered optical waveguide having a larger end and a smaller end. The larger end of the second optical waveguide is disposed proximate to the larger end of the inverted tapered inner core of the first optical waveguide such that an optical beam is to be directed from the smaller end to the larger end of the first optical waveguide from the larger end to the smaller end of the second optical waveguide.

In "TE-TM coupling of a standard fiber to a Si-wire waveguide", written by Raffaella Costa et al., and published in the proceedings of the European Conference on Integrated Optics (ECIO), Copenhagen, Denmark, 25-27 Apr. 2007, light coupling from a small core fiber to a Si-wire waveguide is demonstrated for both TE and TM through a vertical coupler. A polarization independent coupling is said to be realized as a first trial with an efficiency of 72%. The small core fiber to Si-wire coupling is performed through an intermediate waveguide having a squared-shaped core with $\Delta n=4.5\%$ vertically coupled by means of a silicon taper. The Si-wire core is 220 nm thick.

SUMMARY OF THE INVENTION

The present invention relates to an optical mode transformer to efficiently couple an optical fiber to a high index contrast waveguide (HC waveguide). In particular, the mode transformer of the present invention makes possible an efficient coupling of an HC waveguide to a standard single-mode fiber (in the following, shortly, SM fiber). The meaning of "high index contrast" will be better clarified below.

The optical mode transformer according to the present invention comprises semiconductor-based materials, for example III-V compounds or silicon-based materials, such as Si, $SiO_2$ (doped or undoped), SiON, $Si_3N_4$, etc.

A main goal of the invention is to provide a mode transformer that enables a low-loss coupling between the SM fiber mode and the HC waveguide mode, e.g., with an optical loss between fiber and the HC waveguide of not more than 3 dB per two facets of the optical mode transformer as a result of the propagation of an optical mode from the optical fiber to the nominal HC waveguide and vice versa, preferably of not more than 2 dB per two facets.

This transformer can be used, for example, to efficiently couple an optical mode from a standard fiber, whose typical single-mode dimension of the modal area is approximately 80 $\mu m^2$, to the mode in a HC planar waveguide, whose single modal area is typically equal or less than 1 $\mu m^2$, and vice versa.

The optical mode transformer of the invention includes a first waveguide, comprising a first core and a first cladding. The first waveguide can support at least an optical mode, preferably at least one mode for each polarization state (TE and TM), which will be referred to as the first mode. Additionally, the optical transformer of the invention comprises a second waveguide, which is in optical coupling with the first waveguide. The second waveguide comprises a core and a cladding, which will be accordingly named second core and second cladding, respectively. In particular, the optical coupling between the first and second waveguide is a butt coupling. Butt coupling between the first and second waveguides indicates that the two waveguides face one another and are arranged so that an optical mode travelling along the first (second) waveguide is coupled into the second (first) waveguide substantially along the propagating direction it held within the first (second) waveguide. Preferably, in order to achieve an efficient optical coupling, the cores of the two waveguides are arranged facing one another with their respective main longitudinal axes aligned within the given tolerance, as detailed below.

The second waveguide can support at least an optical mode, preferably at least one mode for each polarization state (TE and TM), called the second mode. The refractive index contrast of the first waveguide is smaller than that of the second waveguide. The mode transformer also comprises a third waveguide, having a third core and a third cladding and being in evanescent coupling with the second waveguide. The third waveguide can support at least an optical mode, preferably a mode for each polarization state. The refractive index contrast of the second waveguide is smaller than that of the third waveguide.

The third waveguide is a high index contrast waveguide having a refractive index contrast $\Delta n_3$ not smaller than 18%.

The definition of the refractive index contrast, $\Delta n$, used in the present description is the following:

$$\Delta n = \frac{(n_{core})^2 - (n_{cladding})^2}{2(n_{core})^2}.$$

The effective refractive index is the refractive index of the optical mode travelling along a waveguide and generally is a function of the core, cladding and of the cross-sectional area of a waveguide.

Preferably, the thickness $T_3$ of the third waveguide core is comprised between 100 nm and 400 nm.

The second and the third waveguide are positioned relative to each other in such a way that evanescent coupling is established from the second to the third waveguide or vice versa.

In the following, to simplify the present description, reference will be made to a coupling of a mode from the SM fiber to the third waveguide via the first and second waveguides. However, the present invention encompasses also a mode transformer performing mode coupling in the opposite direction, wherein a mode travelling in the third waveguide is coupled to the second waveguide, then coupled to the first waveguide to be outputted into the SM optical fiber.

A first propagating direction is defined, which is generally coincident or parallel to the main longitudinal axis of the first waveguide, and is the propagating direction of the first optical mode along the first waveguide. Analogously, a second propagating direction is defined for the second waveguide.

In a preferred embodiment of the invention, the first and second waveguide are coplanar. More preferably, the first and second propagating directions are parallel and even more preferably the two directions substantially coincide within a given misalignment tolerance (i.e., the propagating direction of the mode coupled from the first to the second waveguide remains substantially unchanged). For example, the first waveguide is butt-coupled to the second waveguide with an alignment between the main longitudinal axis of the core of the first waveguide and the main longitudinal axis of the core of the second waveguide within ±2 µm, preferably within ±1 µm.

According to a preferred embodiment of the invention, a gap h is present between the first and the second waveguide in the butt coupling section of the optical mode transformer. The gap h is defined as the distance between the end proximal facets of the first and second waveguides along the first propagating direction, i.e., along the longitudinal axis of the first waveguide, the gap separating longitudinally the first and second waveguide. Preferably the gap h is smaller than 10 microns, more preferably smaller than 5 µm and even more preferably smaller than 1 µm. According to an embodiment, the gap h is substantially zero, i.e., an end facet of the first waveguide is in contact with an end facet of the second waveguide.

The core of the third waveguide comprises a tapered region in at least a portion of the evanescent coupling region between the second and the third waveguides.

In a preferred embodiment of the invention, the second waveguide is positioned with respect to the third waveguide so that the two waveguide cores at least partially overlap across a region that is referred herebelow also as the overlapping region. Within the overlapping region, the two waveguide cores are adjacent one another and most of the optical power transfer from one waveguide to the other by evanescent coupling takes place. Preferably, the second and the third waveguides are disposed so that the former is placed above the latter. Preferably, the second and third core are vertically arranged, i.e., lying in two planes arranged at a certain vertical distance (or gap) g defined in a direction substantial perpendicular to the first propagating direction. A cladding layer for example may separate the two cores. For instance, the gap between the second and third core may be large enough (e.g., up to few microns as it will be better clarified below) to allow the integration of micro-heaters on top of the cladding of the third waveguide as shown by element 32 in FIG. 1, e.g., comprising a metallic layer formed on top of a portion of the third cladding, without hindering the efficiency of the evanescent coupling.

In a preferred embodiment, the main longitudinal direction of the third core is substantially parallel to the main longitudinal direction of the second core, so that the propagating direction of the third mode along the third waveguide, referred herebelow to as the third propagating direction, is parallel to the second propagating direction. However, it is to be understood that other configurations may be envisaged. For example, the second and third waveguides can be arranged with the respective cores substantially co-planar and disposed one adjacent to the other at a certain distance (or gap) that is perpendicular to the parallel propagating directions within the two waveguides.

Alternatively, the third waveguide can be placed above the second waveguide, as long as the evanescent tail of the optical mode travelling in the third/second waveguide gives rise to an optical mode propagating in the second/third waveguide.

Therefore, the gap between the second and the third waveguide herein generally indicates the distance between the second core and third core along a direction perpendicular to the second propagating direction.

The first waveguide is apt to be coupled with a standard single mode optical fiber, which can be placed externally of the mode transformer. For example, an end facet of the first waveguide may be butt-coupled to an end of the optical fiber. According to an embodiment, the fiber is butt-coupled to the first waveguide with an alignment between the main longitudinal axis of the fiber core and the main longitudinal axis of the core of the first waveguide within ±2 µm, preferably ±1 µm. As alternative embodiment, the SM fiber can be pigtailed to the mode transformer, e.g., by gluing an end of the fiber to an end facet of the transformer, in correspondence to the core of the first waveguide.

Preferably, the SM optical fiber is brought up to the input of the first waveguide so that its main longitudinal axis lies parallel to the main longitudinal axis of the first waveguide of the mode transformer. Preferably, the SM fiber is laterally and vertically positioned so that the input end of the first waveguide can accept substantially the light from the fiber with relatively low optical loss. The refractive index of the first waveguide and its geometry can be chosen in such a way to get an optimal optical coupling with the SM fiber and the second waveguide. For instance, the first waveguide of the transformer of the invention is preferably realized in a material having a refractive index which is the best compromise to obtain a low loss coupling with the standard SM fiber and at the same time an efficient coupling with the second waveguide.

Preferably, the first waveguide core includes a first tapered region, a first end of which—the end that faces the optical fiber—has a cross sectional area that gradually enlarges along the first propagating direction up to a maximum value. This first tapered region may be preferably followed by a second tapered region of decreasing cross sectional area, i.e., from the maximum cross sectional area reached at the end of the first tapered region, the cross sectional area of the first waveguide core gradually decreases towards a second end of the first waveguide facing the second waveguide and optically coupled to the same so as to have, at the second end, a cross-sectional area smaller than the maximum cross-sectional area. Alternatively, the maximum cross sectional area reached at the end of the first tapered region may be maintained substantially constant for a given longitudinal length up to the second end of the first waveguide core coupled to the second waveguide.

Preferred materials for the first waveguide core are $SiO_2$: Ge and SiON.

Preferably, the second waveguide comprises a first tapered region wherein at a first end facet of the second waveguide optically coupled to the first waveguide, the second core has a cross-sectional area that gradually enlarges along the second propagating direction. Preferably, the smallest cross-sectional area of the tapered region of the second waveguide occurs at the first end facet of the second waveguide. The evanescent optical coupling between the third and second waveguides, where the optical power is transferred from the second (third) to the third (second) waveguide, takes place in a region of the optical mode transformer referred in the following to as the evanescent coupling region, which comprises a portion of the second and of the third waveguide.

Preferably, the second waveguide includes a second tapered region substantially in correspondence of the evanescent coupling region of the second and third waveguide.

According to a preferred embodiment, in the whole evanescent coupling region, the third waveguide core comprises a tapered region which provides a gradual change of the effective refractive index, and thus which provides a mode transformation of the traversing optical signals. By gradually changing the effective refractive index of the third waveguide in the coupling region along the third propagating direction, the mode coupling can be achieved with high efficiency leading to a significant decrease of optical losses. Preferably, the tapered region is structured such that an end of the third waveguide core proximal to the second waveguide has a cross-sectional area that progressively enlarges till the desired guiding core dimensions.

However, the tapered region realized in the third waveguide core may not represent the end of the waveguide, which may further extend along a direction different from the propagating direction, as further explained below.

Preferably, the taper realized in the third waveguide is a linear taper. However, further or different optimisation of the taper profile may be envisaged within the scope of the present invention, such as an exponential or parabolic taper profile.

The initial width (tip) of the third waveguide core is preferably comprised between 80 nm and 200 nm, more preferably between 100 and 150 nm, all dimensions that can be easily obtainable with standard fabrication processes.

In the preferred embodiment of the invention in which the second waveguide is placed above the third waveguide, on a top view of the optical mode transformer, the second and the third waveguide at least partially overlap. This overlapping region includes the evanescent coupling region that extends along the propagating direction defined within the second waveguide. In a preferred embodiment of the invention, the evanescent coupling region and the overlapping region are nearly coincident Preferably, the vertical distance (gap g) between the second and third waveguide cores is substantially constant across the overlapping region of the two waveguides.

According to a further embodiment, both the second and the third waveguides comprise a tapered region that extends in at least part of the evanescent coupling region. Preferably, the tapered region realized in the third waveguide and the tapered region realized in the second waveguide are tapered in opposite directions, i.e., a mode travelling in the second waveguide along the second propagating direction encounters a convergent region (a region of continuously reduced lateral cross section) along the second waveguide core and a divergent region (a region of continuously enlarged lateral cross section) in the third waveguide core. A transformer configuration comprising a second and a third waveguide core, each including a tapered region, wherein the two regions are tapered in the same direction, could also be envisaged.

Applicants have found that in the mode transformer realized according to the above general teaching, lateral misalignments between the second and the third waveguide, i.e., lateral misalignments up to a maximum value of about (±2) µm between the axes of the second and third waveguide cores perpendicular to their respective main longitudinal directions do not result in a significant performance degradation of the transformer for both the TE/TM polarizations of the optical modes.

Applicants have found that within more limited ranges of the refractive index of the third waveguide and/or third waveguide thicknesses, the performances of the optical mode transformer of the invention can be further optimised.

According to a first preferred embodiment of the invention, the mode transformer includes a third waveguide which has a refractive index contrast $\Delta n_3$ between the core and the cladding not smaller than 40% and a third core thickness $T_3$ comprised between 120 nm and 180 nm.

In the above identified ranges of thickness and refractive index contrast $\Delta n_3$ for the third waveguide, Applicants have found that the mode transformer is extremely efficient and a substantially complete mode power transfer takes place within a "reasonable" taper length, L, of the third waveguide core, which is preferably not larger than 3000 µm, more preferably not larger than 1500 µm, so as to allow easy integration with other optical and/or electrical components.

Preferably, the third core of the third waveguide is realized in a material having a refractive index $n_{third\ core} > 3$. Preferred materials are for example Si, InP, AlGaAs, SiGe, or Ge.

In the above mentioned first preferred embodiment of the invention, the refractive index contrast of the first waveguide, $\Delta n_1$, is preferably within the range $(1.2\pm0.6)\%$. Preferably the core thickness $T_1$ of the first waveguide is comprised between 1 µm and 6 µm.

Preferably, the width of the third waveguide core at the end of the tapered region in the first preferred example, i.e., the guiding width of the third core, is comprised between 0.25 µm and 1.50 µm.

Preferably, the second waveguide of the first preferred embodiment has a refractive index contrast $\Delta n_2=(3.4\pm1.4)\%$. Preferably, the core thickness $T_2$ of the second waveguide is comprised between 0.5 µm and 4 µm.

According to a second preferred embodiment of the invention, the mode transformer comprises a third waveguide which has a refractive index contrast $\Delta n_3$ between the core and cladding comprised between 18% and 30% and a third core thickness $T_3$ comprised between 100 nm and 400 nm.

Preferably, the third core of the third waveguide of the transformer realized according to the second preferred embodiment of the invention is realized in a material having a refractive index $1.8 < n_{third\ core} < 2.4$. Preferred materials for the third core of the transformer of this second embodiment are for example wide-bandgap semiconductors such as $Si_3N_4$.

Preferably, the width of the third waveguide core at the end of the tapered region in the second preferred example, i.e., the guiding width of the third core, is comprised between 0.3 µm and 3.0 µm.

Preferably, the second waveguide of the second preferred embodiment has a refractive index contrast $\Delta n_2=(2.8\pm1.0)\%$. Preferably, the thickness $T_2$ of the second core of the second waveguide of the transformer of the second embodiment of the invention is comprised between 0.5 µm and 4 µm.

In the second embodiment of the present invention, the refractive index contrast of the first waveguide is $\Delta n_1=(1.2\pm0.6)\%$. Preferably, the core thickness $T_1$ of the first waveguide is comprised between 1 µm and 6 µm.

According to a third preferred embodiment of the invention, the mode transformer includes a third waveguide which has a refractive index contrast $\Delta n_3$ between the core and the cladding not smaller than 40% and a third core thickness $T_3$ comprised between 200 nm and 400 nm.

Preferred materials for the third waveguide core and preferred refractive indices for the third waveguide core can be selected within the same ranges detailed with reference to the first preferred embodiment.

In the third embodiment, the second waveguide has preferably a refractive index contrast $\Delta n_2=(4.0\pm1.0)\%$. Preferably, the thickness $T_2$ of the second core of the second waveguide of the transformer of the third embodiment of the invention is comprised between 1.2 µm and 3 µm.

The refractive index contrast of the first waveguide in the third preferred embodiment is preferably $\Delta n_1=(1.4\pm0.3)\%$. Preferably, the core thickness $T_1$ of the first waveguide is comprised between 1 µm and 5 µm.

The length L of the coupling region in the first and second embodiment is preferably comprised between 100 µm and 3000 µm, while in the third embodiment L is preferably comprised between 200 µm and 5000 µm.

Preferably, the gap g present between the core of the second waveguide and the core of the third waveguide is comprised between 0.1 µm and 3 µm in the first preferred embodiment of the transformer of the invention, between 0.1 µm and 5 µm in the second preferred embodiment of the invention, between 0.5 µm and 2 µm in the third preferred embodiment of the invention The value of the gap g between the second and third cores selected for a specific transformer may be chosen, among others, in relation to the width of the taper tip of the tapered region (i.e., where the cross-sectional area of the tapered region is the smallest) realized in the third waveguide core. Preferably, the wider the third waveguide tip the larger the gap g in order to minimize losses due to optical mode mismatch.

Applicants have found that mode transformers according either to the first or to the second preferred embodiment of the invention can preserve the polarization status of an input optical signal entering the optical mode transformer.

Generally, single-mode optical fibers or single mode waveguides can support two polarization modes, which are referred to as TE (transverse electric) and TM (transverse magnetic) modes. Given an optical mode having a certain input state of polarization when entering the transformer, it is preferably desired in some applications that the behaviour of the optical coupling to the HC waveguides is the same regardless of the input polarization state. For instance, the signal that is transmitted across the optical fiber may be randomly polarized, i.e., it may have a random superposition of the two TE/TM polarizations. In this case, it is desired that the polarization states at the input of the mode transformer emerge substantially unaffected at the output of the coupling region of the third waveguide. Within this meaning, the mode transformer of a preferred embodiment of the present invention is "transparent" to the polarization states of the incoming optical signals.

Applicants have realised that—in a waveguide—the optical mode should avoid as much as possible travelling along a core region having a square or almost square cross-sectional area in order to avoid degeneration of the polarization modes. In the present case, a square or almost square cross-sectional area can mean that, named L one of the sides of a waveguide rectangular cross-sectional area, this area is considered to be square or almost square if the difference between the L side and all the other sides of the area is smaller than 0.2 L, more preferably smaller than 0.1 L. In this core region, due also to the unavoidable fabrication imperfections of the core design and dimensions of its cross-sectional area along the propagating direction, degeneration of the TE/TM modes very likely can lead to polarization mixing.

Additionally, if polarization mixing takes place in a high index waveguide, wherein the TM and TE polarization modes experience a relatively large refractive index difference, the optical mode becomes strongly affected by polarization-dependent losses and polarization mode dispersion.

Applicants have understood that, in case it is desired to obtain a mode transformer which is also polarization "transparent", the coupling region of the transformer is preferably designed so that most of the optical power transfer between the second and the third waveguides takes place in correspondence to a region of the third waveguide core not including a square or almost square cross-sectional area.

In a mode transformer having $\Delta n_3$ not smaller than 40% and a third core thickness $T_3$ comprised between 120 and 180 nm, due to a relative "thin" third waveguide core, only a relatively small fraction of the mode power is transferred from the second to the third waveguide when the mode "experiences" the TE/TM degeneration in correspondence to the region of the third core comprising a square cross-section. Polarization scrambling (or mixing) is therefore substantially avoided.

In mode coupling between the second and third waveguide, generally, the lower is the refractive index contrast between the two waveguides the slower is the mode transfer from the second to the third waveguide. In case of 18%<$\Delta n_3$<30%, a thicker third waveguide core than in the case of $\Delta n_3$>40%, i.e., thicker than about 180 nm, can be thus envisaged always while preserving the polarization of the travelling optical modes. In the transformer having 18%<$\Delta n_3$<30%, the taper region realized in the third waveguide core has still a portion including a square cross section which may be located at a distance from the tip which is longer than in the transformer according to the first embodiment of the invention due to the increased thickness. However, since the transfer of the mode is "slower" than in the case of $\Delta n_3$>40%, the TM/TE polarizations degenerate when only a small fraction of the mode is travelling in the third waveguide while most of the mode power is still guided in the second waveguide. The thickness of the third waveguide core is preferably not larger than 400 nm.

In the following, for sake of simplicity, the transformer according to the first preferred embodiment of the invention indicates a transformer including a third waveguide having $\Delta n_3$>40% and a third core thickness $T_3$ comprised between 120 nm and 180 nm; the transformer according to the second preferred embodiment of the invention means a transformer including a third waveguide having 18%<$\Delta n_3$<30% and a third core thickness $T_3$ comprised between 100 nm and 400 nm; and the transformer according to the third preferred embodiment of the invention indicates a mode transformer comprising a third waveguide having $\Delta n_3$>40% and a third core thickness comprised between 200 nm and 400 nm. The usage of the term "transformer" without additional specifications means that the sentence in which the term is used applies to mode transformers according to any of the embodiments of the invention.

Transformers according to any of the three preferred embodiments show optical losses when coupled to a SM standard fiber lower than 3 dB per two facets of the optical mode transformer as a result of the propagation of an optical mode from the optical fibre to the nominal HC waveguide and vice versa.

To obtain optical losses even smaller than 3 dB, in particular not larger than 2 dB per two facets, the refractive index contrast of the first, second and third waveguides, $\Delta n_1$, $\Delta n_2$, $\Delta n_3$, respectively, and the first, second and third core thickness, $T_1$, $T_2$, $T_3$, are preferably and independently comprised within narrower ranges.

More specifically, in the first preferred embodiment of the invention, the value of $\Delta n_2$ of the second waveguide is preferably within the range (2.6±0.6)%, according to a first variant. According to a second variant, the value of $\Delta n_2$ is preferably (4.2±0.6)%. Preferred materials for the second waveguide core are for example SiON or $SiO_2$:Ge. According to an additional preferred variant of the first embodiment of the present invention, the second core thickness $T_2$ is comprised between 1 μm and 4 μm if $\Delta n_2$=(2.6±0.6)%, and $T_2$ is comprised between 0.5 μm and 3 μm if $\Delta n_2$ is (4.2±0.6)%. According to another preferred variant of the first embodiment of the invention, the first core has a refractive index contrast $\Delta n_1$=(1.1±0.5)% if $\Delta n_2$=(2.6±0.6)%, and $\Delta n_1$=(1.5±0.2)% if $\Delta n_2$ is (4.2±0.6)%.

The first core thickness $T_1$ is comprised between 1 μm and 6 μm if $\Delta n_1$=(1.1±0.5)%, and $T_1$ is comprised between 1 μm and 5 μm if $\Delta n_1$=(1.5±0.2)%.

According to a first variant of the second embodiment of the invention, the value of $\Delta n_2$ of the second waveguide is comprised between $\Delta n_2$=(2.3±0.3)%. According to a second variant of the second embodiment, the value of $\Delta n_2$ of the second waveguide is comprised between $\Delta n_2$=(3.50±0.25)%.

Preferably, the second core thickness $T_2$ is between 1 μm and 4 μm if $\Delta n_2$=(2.3±0.3)%, and between 0.5 μm and 3 μm, if $\Delta n_2$=(3.50±0.25)%.

Preferred materials for the second waveguide core are for example SiON or $SiO_2$ or Ge.

Preferably, the first waveguide has $\Delta n_1$=(1.2±0.5)% if $\Delta n_2$=(2.3±0.3)%, and $\Delta n_1$=(1.5±0.2)%, if $\Delta n_2$=(3.50±0.25)%.

Preferably, the first core thickness $T_1$ is comprised between 1 μm and 6 μm if $\Delta n_1$=(1.2±0.5)% and between 1 μm and 5 μm, if $\Delta n_1$=(1.5±0.2)%.

According to a first variant of the third embodiment of the invention, the value of $\Delta n_2$ of the second waveguide is comprised between $\Delta n_2$=(3.50±0.25)%. According to a second variant of the third embodiment, the value of $\Delta n_2$ of the second waveguide is comprised between $\Delta n_2$=(4.5±0.25)%.

Preferably, the second core thickness $T_2$ is comprised between 1.5 μm and 4 μm if $\Delta n_2$=(3.50±0.25)% and $T_2$ is comprised between 1.2 μm and 3 μm, if $\Delta n_2$=(4.5±0.25)%.

Preferred materials for the second waveguide core are for example SiON or $SiO_2$:Ge.

Preferably, the first waveguide has $\Delta n_1$=(1.5±0.2)% if $\Delta n_2$=(3.50±0.25)% and $\Delta n_1$=(1.6±0.0)%, if $\Delta n_2$=(4.50±0.25)%.

Preferably, the first core thickness $T_1$ is between 1 μm and 5 μm in both variants of the third embodiment.

BRIEF DESCRIPTION OF THE DRAWINGS

Further features and advantages of an optical mode transformer according to the present invention will become more clear from the following detailed description thereof, given with reference to the accompanying drawings, where:

FIG. 2 is a partial top view taken along the line AA of the transformer of FIG. 1;

FIGS. 3a-3d are lateral cross sections of the transformer of FIG. 1 taken along the dashed lines of FIG. 2;

FIGS. 5a and 5b are two lateral cross sections of the transformer of FIG. 1 taken along the dashed lines of FIG. 4 indicated with "IN" and "MIDDLE";

FIGS. 6a-6d are simulations of the behaviour of a TM mode travelling in the transformer of FIG. 1;

FIGS. 7a-7c are simulations of the behaviour of a TE mode travelling in the transformer of FIG. 1;

PREFERRED EMBODIMENTS OF THE INVENTION

Figure 1:
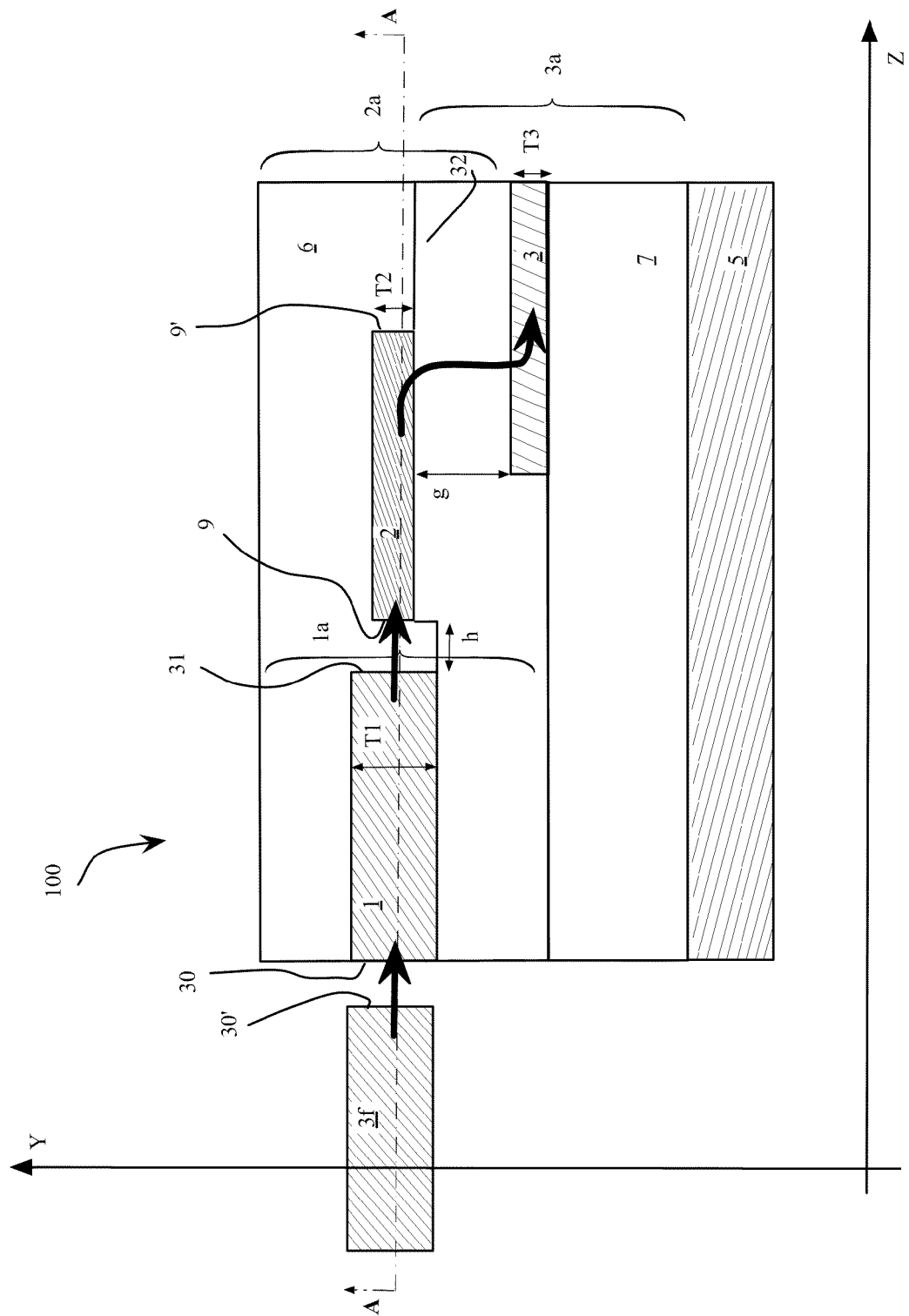
FIG. 1 is a schematic longitudinal view of an embodiment of the optical mode transformer of the invention.

With initial reference to FIG. 1, an optical mode transformer according to an embodiment of the present invention is globally indicated with reference number 100. The figure is a schematic representation of a mode transformer in which dimensions of the elements comprised in the transformer are not drawn to scale.

The mode transformer 100 comprises a first waveguide 1a, an end facet 30 of which forms the input/output of the mode transformer 100, and which is apt to be coupled to an external SM fiber 3f in alignment with the first waveguide.

The mode transformer 100 further comprises a second waveguide 2a a first end 9 of which is butt coupled to an end 31 of the first waveguide 1a opposite to the one facing the fiber 3f. The second waveguide can comprise a second end 9' opposite to the first end 9. As shown in FIG. 1, the first waveguide 1a is coupled with one of its end 30 to the SM fiber 3f and with its opposite end 31 to the second waveguide 2a.

The end facet 30 of the waveguide 1a is preferably butt coupled to an end facet 30' of the optical fiber. As alternative example, the coupling of the SM fiber is obtained via a fiber pigtail to the mode transformer 100.

The first waveguide 1a comprises a core, hereafter referred to as the first core 1, and a cladding, named first cladding. Analogously, the second waveguide comprises a core 2 and a cladding named in the following second core and second cladding. The first waveguide 1a has a refractive index contrast smaller than the refractive index contrast of the second waveguide 2a.

Preferably, the main longitudinal directions of the second and first waveguides are parallel to each other and more preferably they are both parallel to the main longitudinal direction of the SM fiber. This common direction is conventionally indicated with axis Z in FIG. 1. The Z-axis also defines the main propagating direction of an optical signal travelling within the waveguides.

According to a preferred embodiment, the geometrical axis of the core of the first waveguide and the geometrical axis of the core of the second waveguide coincide, so that the two are aligned one after the other in the Z direction. The alignment between the two core axes is preferably within ±2 μm, more preferably within ±1 μm.

Preferably, a longitudinal gap h is present, i.e., a distance along the Z direction, between the end 31 of the first waveguide core 1 and the end 9 of the second waveguide core 2 to which the former is coupled. The value of the gap h is preferably smaller than 10 μm, more preferably smaller than 5 μm, even more preferably smaller than 1 μm. According to an alternative embodiment, the value of the longitudinal gap h is substantially zero, i.e., the end facets 31 and 9 being in contact one to another.

The transformer 100 further comprises a third waveguide 3a, on top of which the second waveguide 2a is vertically arranged. The third waveguide 3a comprises a core 3 (third core in the following). Third waveguide 3a has a refractive index contrast larger than the refractive index contrast of the second waveguide 2a.

According to a preferred embodiment of the invention, the third core 3 is disposed on a lower cladding layer 7. The lower cladding layer 7 can be arranged on a substrate 5. An upper cladding layer 4 is disposed on the third core 3. The lower cladding layer 7 and the upper cladding layer 4 surround the core 3 and define the third cladding of the third waveguide 3a.

The second waveguide core 2 is disposed on cladding layer 4 and is covered by an upper cladding layer 6. The cladding layers 4 and 6 surround the core 2 and define the second cladding of the second waveguide 2a.

According to a preferred embodiment, the first waveguide core 1 is also realized on cladding layer 4, preferably on an etched region realized in the same, and it is covered by another cladding layer, which is preferably the upper cladding layer 6 of the second waveguide 2a. The cladding layers 4 and 6 surround the core 1 and define also the first cladding of the first waveguide 1a.

In a preferred embodiment, the first cladding is formed of the same material as the cladding of the second waveguide 2a and of the upper cladding of the third waveguide 3a. The refractive index of the common cladding is smaller than the refractive index of the first core 1 of the first waveguide 1a.

Preferably, the first, second and third waveguide are formed on a common silicon-on-insulator (SOI) structure. Preferably, the third waveguide core 3 is formed in the Si upper layer of the SOI structure where the buffer layer, e.g., made of $SiO_2$, is the lower cladding 7 formed on a Si substrate 5.

The modes which are guided from the SM fiber into the first waveguide 1a are "spread out" modes, because of their relatively large mode diameter, which typically is of 9-10 μm.

In order to avoid optical leakage, it is preferred that, if the substrate 5 is made of a material having a high refractive index, such as silicon, the cladding layer 7 arranged on the substrate has a thickness of more than 3 μm, more preferably not less than 15 μm.

The third waveguide 3a is a high-index contrast (HC) waveguide and its refractive index $\Delta n_3$ is not smaller than 18%. The thickness $T_3$ of the third core 3 is preferably comprised between 100 nm and 400 nm.

A top view in a (X,Z) plane of the coupling regions between the first waveguide 1a and the SM fiber 3f and between the first waveguide 1a and the second waveguide 2a of the transformer 100 is depicted in FIG. 2. The figure is a partial (i.e., the end 9' of the second core 2 and the third waveguide core 3 are not shown, the view is interrupted at the dot-dashed line) top-view section of the structure of FIG. 1 taken along the AA axis.

By way of example, FIG. 1 depicts the case of an optical mode (schematically indicated with an arrow) exiting from the SM fiber 3f and being coupled into the first waveguide 1a. With reference again to FIG. 2, the first core 1 includes a first tapered region 26 wherein the first core 1 has a lateral width which gradually enlarges from a minimum input width $W_{1IN}$ (FIG. 3a) at end facet 30 facing fiber 3f to a maximum width $W_{1MIDDLE}$ (FIG. 3b). From this maximum width $W_{1MIDDLE}$, a second tapered region 25 contiguous to the first tapered region 26 may be present where the lateral width of the first core 1 gradually decreases from the value $W_{1MIDDLE}$ to a value $W_{1OUT} < W_{1MIDDLE}$ at the facet 31 of second tapered region 25 facing the second waveguide 2a. According to the embodiment represented in FIG. 2, the end facet 31 of the second tapered region 25 also represents the end facet of the first waveguide core 1.

According to another embodiment (not shown), the region 25 may have a constant width with no substantial tapering along the main longitudinal direction ($W_{1MIDDLE} = W_{1OUT}$) of the first waveguide, i.e., the Z-axis in the embodiment of FIG. 1.

The mode travelling in the first waveguide 1a is then coupled to the second waveguide 2a.

The second waveguide core 2 may include a first tapered region 24 the end of which (9) is butt coupled to the second tapered end region 25 of the first waveguide core 1. Always with reference to FIG. 2, the width of the second waveguide core 2 enlarges from a taper tip width $W_{2IN}$ (see FIG. 3c) at its end 9 to a width $W_{2IN2} > W_{2IN}$. The width $W_{2IN2}$ (see FIGS. 2 and 3d) of the core 2 can remain substantially constant up to its end 9' or can remain constant for a certain length and then be followed by a second tapered region, as explained below.

The mode further propagates into the second waveguide 2a up to a region where evanescent coupling takes place with the third waveguide 3a.

As visible in FIG. 1, for a given region extending along the Z axis, the two waveguide cores 2, 3 extend one above the other at a mutual distance, g, along a vertical Y axis, perpendicular to the Z axis. The region along the Z-axis in which the waveguide cores are placed one on top of the other is referred to as the overlapping region, which substantially comprises the evanescent coupling region wherein the two waveguides are optically coupled. In the preferred embodiment depicted in FIGS. 1 and 4, the overlapping region and the coupling region are substantially coincident.

Figure 4:
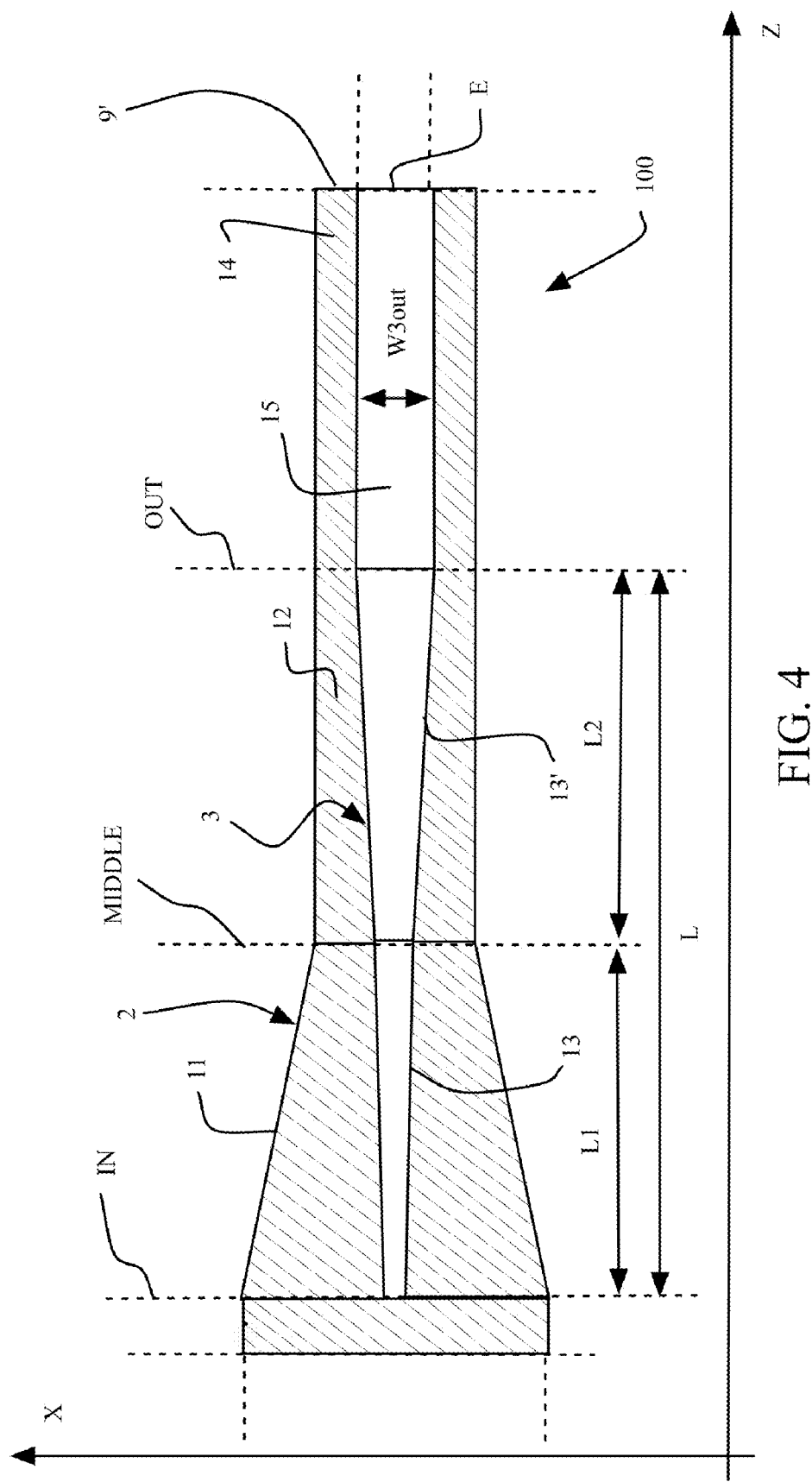
FIG. 4 is another partial top view of the transformer of FIG. 1 where the overlapping region between the second and the third waveguide is schematically represented according to an embodiment of the invention.

With reference now to FIG. 4, a top view in a (X,Z) plane across the overlapping region where the two waveguides are vertically arranged one on top the other is depicted in an enlarged scale. This figure can be seen as a continuation along the Z direction of FIG. 2. In the figure, both cores 2, 3 are visible for clarity purposes; however, it is to be understood that only the second core would be visible on a top-view section made along an axis of the second core, while the third core would remain hidden under cladding layer 4.

In the embodiment represented in FIG. 4, the second waveguide core 2 overlaps the third waveguide core 3 in a region extending along the Z-axis. Beyond the two ends of the overlapping region, only the third core (on the right of the figure) or only the second waveguide core (on the left of the figure) is present.

However, other configurations may be envisaged. For example, the second waveguide may further extend, for example deviating from the Z direction. Additionally, the third waveguide may also extend further, either deviating from the Z direction or extending as a continuation of the taper tip, as better clarified below.

Figure 13:
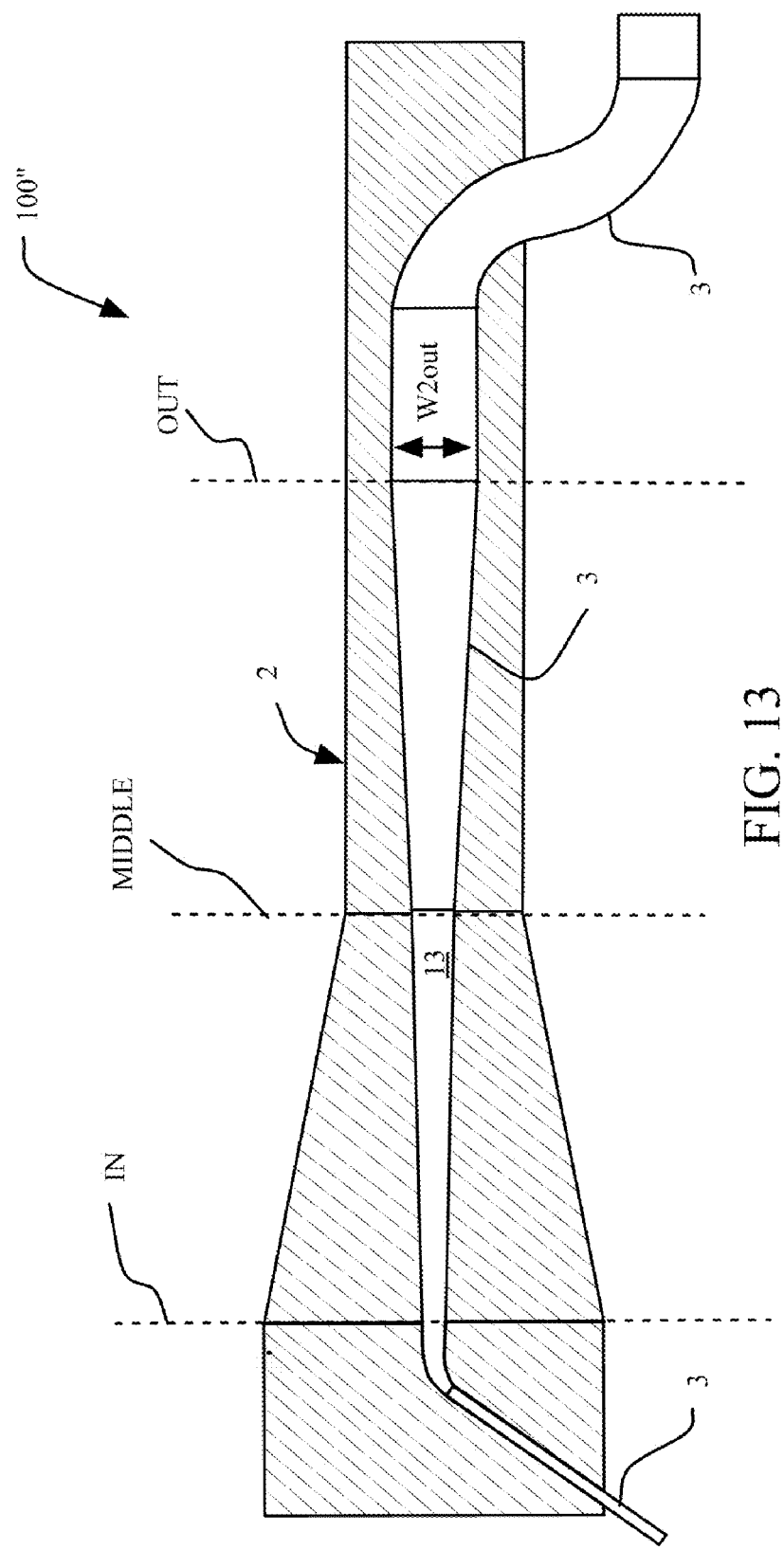
FIG. 13 is a partial top view of the transformer of FIG. 1 where the overlapping region between the second and the third waveguide is schematically represented according to a further embodiment of the invention.

FIG. 13 shows a top view of the overlapping region of a transformer 100" according to a different embodiment of the present invention. The characteristics of transformer 100" not depicted in FIG. 13 are to be considered identical to those of transformer 100. The second waveguide core 2 of transformer 100" further extends along the Z direction also after the evanescent coupling has taken place. In addition, the third waveguide core 3 does not start at the beginning of the coupling region, e.g., the taper tip is not an end of the third core, but it extends along a direction forming a given angle with the Z direction, for example the angle is chosen in such a way that the tip is adiabatically "pulled away" from the second waveguide so that no significant optical coupling takes place between them. The second and third waveguide cores overlap along the Z-axis when the third core has a minimum cross sectional area, i.e., the overlapping takes place when the third core has the tip cross sectional area. After the coupling region (on the right of FIG. 13), the third core 3 may further bends towards another direction.

In the following, only to simplify the description, reference will be made to a mode arriving from the first waveguide 1a, and travelling from the second waveguide 2a down to the third waveguide 3a (from left to right in FIGS. 4 and 13), and thus the elements of the transformer 100 are described by taking this direction into consideration, so that words such as "enlarge" or "reduce" will refer to previous waveguide dimensions in the mode propagation direction. However, it is to be understood that present embodiments may encompass an optical mode travelling in the opposite direction and being input from the third waveguide and being optically coupled to the second waveguide and then to the first waveguide.

As represented in FIG. 4, the overlapping region may be divided in three different sections (separated in the figure by the dashed lines referred to as axis "IN", "MIDDLE", "OUT" and "E", respectively) for each waveguide wherein the waveguides 2a,3a have different shapes. It is to be understood that not all sections are needed and they can be realized to maximise the power transfer efficiency and minimize the overall length of the device. In a first section of length $L_1$ along the Z axis, represented as the region between axis "IN" and "MIDDLE", both second and third waveguides 2a, 3a include a tapered region: the second core 2 includes a second tapered region 11 in which its lateral width (i.e., its width in the X direction perpendicular to the Z axis) is reduced from $W_{2IN2}$ to $W_{2MIDDLE}$. The second tapered region 11 can be contiguous to the optional first tapered region 24 coupled to the first waveguide (FIG. 2) or can follow a region of constant width. FIGS. 5a and 5b show two lateral cross sections in the (X,Y) plane taken along axis "IN" and axis "MIDDLE", respectively. In the first section, the third core 3 includes a tapered region 13 where its lateral width enlarges from $W_{3IN}$ (the tip of the tapered region 13) to $W_{3MIDDLE}$. $W_{3IN}$ represents the smallest width of the third waveguide core 3 along the main propagating direction (the Z-axis in FIG. 4), and coincides with the width of one of the waveguide core ends from which the tapered region extends. The first cross section of FIG. 5a shows the third core 3 at its smallest width and the second core 2 at its largest width in the represented waveguide portions of FIG. 4, i.e., at $W_{3IN}$ and $W_{2IN2}$. In the second cross section of FIG. 5b, the third core 3 is represented at its intermediate width $W_{3MIDDLE}$, while the second core 2 is depicted at its smallest width $W_{2MIDDLE}$ of the first region.

From the first section ending at the axis indicated with "MIDDLE", a second section of length $L_2$ along the Z axis extends, in which the second core 2 maintains substantially the same cross sectional area in a constant width section 12, while the third core 3 includes a further tapered region 13' adjacent to the tapered region 13 and being substantially its continuation, further increasing its width up to $W_{3OUT}$. After this second section, ending at the "OUT" axis, an optional third section may further extends, in which both first and second cores 2,3 include a constant width section 14,15 wherein the two cores maintain substantially the same cross sectional area. The end of the third section (ending at axis "E") also preferably represents the end of the second core 2. From that point onwards, only the third core 3 extends further along the Z axis.

The sum of the lengths of the first and second section $L_1$ and $L_2$ gives the overall length L of the third core tapered region of the transformer 100. Preferably, within the tapered region 13, 13' in the third waveguide core 3 the evanescent coupling takes place, thus at the end of the tapered region the mode travelling in the transformer inputted in the first waveguide is completely coupled from the second to the third waveguide. Although it is preferred to have a third core with a tapered region extending substantially along the whole evanescent coupling region, it is to be understood that the tapered region may further extend beyond the coupling region between the two waveguides.

According to a different embodiment, as seen in FIG. 13, the third waveguide does not terminate with the taper tip of the tapered region 13, but it extends along the Z direction maintaining a constant tip width $W_{3IN}$.

According to a first preferred embodiment of the invention, the refractive index contrast $\Delta n_3$ of the third waveguide is greater than 40%. Additionally, according to the same first embodiment of the invention, the thickness $T_3$ of the third core 3 is preferably comprised between 120 nm and 180 nm. Preferably, the third core 3 of the third waveguide is realized in a material having a refractive index $n_{third\ core} > 3$, more preferably $n_{third\ core} > 3.2$. Preferred materials are for example Si, InP, AlGaAs, SiGe, more preferably Si.

According to a second embodiment of the invention, the third waveguide 3a has a refractive index contrast $\Delta n_3$ comprised between 18% and 30% and a preferred third core 3 thickness $T_3$ comprised between 100 nm and 400 nm. Preferably, the third core 3 of the third waveguide 3a is realized in a material having a refractive index $1.8 < n_{third\ core} < 2.4$. Preferred materials for the third core 3 of the transformer 100 according to this second embodiment of the invention are for example wide—bandgap semiconductors such as $Si_3N_4$, or silicon-enriched nitride (SiN).

According to a third preferred embodiment of the invention, the refractive index contrast $\Delta n_3$ of the third waveguide is greater than 40%. Additionally, according to the same third embodiment of the invention, the thickness $T_3$ of the third core 3 is preferably comprised between 200 nm and 400 nm.

Preferably, the third core 3 of the third waveguide is realized in a material having a refractive index $n_{third\ core} > 3$, more preferably $n_{third\ core} > 3.2$. Preferred materials are for example Si, InP, AlGaAs, SiGe, more preferably Si.

The distance between the second and third waveguide, or gap g, is preferably comprised between 0.1 μm and 3 μm in the transformer according to the first embodiment of the invention, between 0.1 μm and 5 μm in the transformer according to the second embodiment of the invention and between 0.5 μm and 2 μm in the transformer according to the third embodiment of the invention.

The length L of the coupling region is preferably comprised between 100 μm and 3000 μm in the transformer according to the first and second embodiments of the invention, and between 200 μm and 5000 μm in the transformer according to the third embodiment of the invention.

The refractive index contrast $\Delta n_1$ and the core thickness $T_1$ of the first waveguide 1a and the refractive index contrast $\Delta n_2$ and the core thickness $T_2$ of the second waveguide 2a are preferably chosen according to the table 1 written below in the different preferred embodiments of the invention:

TABLE 1

| Third waveguide | Second waveguide | First waveguide |
|---|---|---|
| First embodiment<br>$\Delta n_3 > 40\%$,<br>120 nm $\leq T_3 \leq$ 180 nm<br>$n_{third\ core} > 3$ | $\Delta n_2 = (3.4 \pm 1.4)\%$<br>0.5 μm $\leq T_2 \leq$ 4 μm<br>$n_{second\ core} = 1.495 \pm 0.025$ | $\Delta n_1 = (1.2 \pm 0.6)\%$<br>1 μm $\leq T_1 \leq$ 6 μm<br>$n_{first\ core} = 1.465 \pm 0.010$ |
| Second embodiment<br>18% $< \Delta n_3 <$ 30%,<br>100 nm $\leq T_3 \leq$ 400 nm<br>$1.8 < n_{third\ core} < 2.4$ | $\Delta n_2 = (2.8 \pm 1.0)\%$<br>0.5 μm $\leq T_2 \leq$ 4 μm<br>$n_{second\ core} = 1.48 \pm 0.03$ | $\Delta n_1 = (1.2 \pm 0.6)\%$<br>1 μm $\leq T_1 \leq$ 6 μm<br>$n_{first\ core} = 1.465 \pm 0.010$ |
| Third embodiment<br>$\Delta n_3 > 40\%$,<br>200 nm $\leq T_3 \leq$ 400 nm<br>$n_{third\ core} > 3$ | $\Delta n_2 = (4.0 \pm 1.0)\%$<br>1.2 μm $\leq T_2 \leq$ 3 μm<br>$n_{second\ core} = 1.51 \pm 0.02$ | $\Delta n_1 = (1.4 \pm 0.3)\%$<br>1 μm $\leq T_1 \leq$ 5 μm<br>$n_{first\ core} = 1.467 \pm 0.005$ |

Transformers according either to the first, the second or the third preferred embodiment of the invention, wherein the first, second and third waveguides have a refraction index included in the preferred ranges of table 1, show optical losses lower than 3 dB per two facets, when coupled to a SM standard fiber 3f.

Table 1 also indicates preferred range values for the refractive index of the first and second core 1, 2. Possible materials in which the second core 2 is realized are for example Ge-doped $SiO_2$ or SiON. Possible materials in which the first core 1 is realized are for example Ge-doped $SiO_2$.

More preferred ranges for the first waveguide 1a and second waveguide 2a refractive index and thickness are listed in table 2. Transformers 100 according either to the first, second or third preferred embodiment of the invention wherein the first and second waveguides have refractive index and core thickness included in the above listed ranges of Table 2 exhibit optical losses below 2 dB per two facets.

TABLE 2

| Third waveguide | Second waveguide | First waveguide |
|---|---|---|
| First embodiment<br>$\Delta n_3 > 40\%$,<br>120 nm $\leq T_3 \leq$ 180 nm<br>$n_{third\ core} > 3$ | $\Delta n_2 = (2.6 \pm 0.6)\%$<br>1 μm $\leq T_2 \leq$ 4 μm<br>$n_{second\ core} = 1.485 \pm 0.010$<br>$\Delta n_2 = (4.2 \pm 0.6)\%$<br>0.5 μm $\leq T_2 \leq$ 3 μm<br>$n_{second\ core} = 1.510 \pm 0.010$ | $\Delta n_1 = (1.1 \pm 0.5)\%$<br>1 μm $\leq T_1 \leq$ 6 μm<br>$n_{first\ core} = 1.462 \pm 0.009$<br>$\Delta n_1 = (1.5 \pm 0.2)\%$<br>1 μm $\leq T_1 \leq$ 5 μm<br>$n_{first\ core} = 1.468 \pm 0.003$ |

TABLE 2-continued

| Third waveguide | Second waveguide | First waveguide |
|---|---|---|
| Second embodiment | $\Delta n_2 = (2.3 \pm 0.3)\%$ | $\Delta n_1 = (1.2 \pm 0.5)\%$ |
| $18\% < \Delta n_3 < 30\%$, | $1\ \mu m \leq T_2 \leq 4\ \mu m$ | $1\ \mu m \leq T_1 \leq 6\ \mu m$ |
| $100\ nm \leq T_3 \leq 400\ nm$ | $n_{second\ core} = 1.480 \pm 0.005$ | $n_{first\ core} = 1.465 \pm 0.009$ |
| $1.8 < n_{third\ core} < 2.4$ | $\Delta n_2 = (3.50 \pm 0.25)\%$ | $\Delta n_1 = (1.5 \pm 0.2)\%$ |
| | $0.5\ \mu m \leq T_2 \leq 3\ \mu m$ | $1\ \mu m \leq T_1 \leq 5\ \mu m$ |
| | $n_{second\ core} = 1.510 \pm 0.004$ | $n_{first\ core} = 1.468 \pm 0.003$ |
| Third embodiment | $\Delta n_2 = (3.50 \pm 0.25)\%$ | $\Delta n_1 = (1.5 \pm 0.2)\%$ |
| $\Delta n_3 > 40\%$, | $1.5\ \mu m \leq T_2 \leq 4\ \mu m$ | $1\ \mu m \leq T_1 \leq 5\ \mu m$ |
| $200\ nm \leq T_3 \leq 400\ nm$ | $n_{second\ core} = 1.500 \pm 0.004$ | $n_{first\ core} = 1.482 \pm 0.004$ |
| $n_{third\ core} > 3$ | $\Delta n_2 = (4.50 \pm 0.25)\%$ | $\Delta n_1 = (1.6 \pm 0.1)\%$ |
| | $1.2\ \mu m \leq T_2 \leq 3\ \mu m$ | $1\ \mu m \leq T_1 \leq 5\ \mu m$ |
| | $n_{second\ core} = 1.516 \pm 0.005$ | $n_{first\ core} = 1.469 \pm 0.002$ |

In operation, the functioning of the transformer 100 can be understood with the help of numerical simulations of the optical mode at various positions within the mode transformer 100. In particular the evanescent coupling between the second and the third waveguide is described. Simulations of a TM and a TE mode inputted in the second waveguide 2a from the SM fiber 3f via the first waveguide 1a and then coupled to the third waveguide 3a are shown in the figures from 6a to 6d (TM mode) and from 7a to 7c (TE mode), to pictorially follow the evolution and coupling of the mode in the transformer 100. The FIG. 6a (7a) shows the TM (TE) mode at the input of the coupling region, i.e., at the location corresponding to FIG. 5a: the mode is travelling substantially all confined within the second core 2. FIG. 6b (7b) shows the mode at the "middle" (i.e., in the location corresponding to the "MIDDLE" axis of FIG. 4) of the coupling region, corresponding to the cross section of FIG. 5b: the TM (TE) mode is partially transferred to the third core 3, but still a relevant portion of it is guided in the second core 2. At the output of the coupling region, which corresponds in this case to the end of the second sections 13', 12 of the second and third core (axis "OUT"), the mode is substantially completely transferred to the third core 3, as shown in FIG. 6c (7c). FIG. 6d represents a longitudinal cross section of the transformer 100 substantially analogous to a portion of FIG. 1 visualizing the TM mode evolution along the evanescent coupling section.

EXAMPLE 1

A germanium-doped $SiO_2$ ($SiO_2$:Ge) second waveguide core, with $n_{second\ core} = 1.483$ and $\Delta n_2 = 2.5\%$ is vertically stacked on top of a 150 nm thick Si waveguide ($n_{third\ core} = 3.4756$, $\Delta n_3 = 40\%$), the two being separated by a 1.2 μm oxide layer (TEOS) having $n_{cladding} = 1.446$ at 1550 nm. Second and third core are vertically aligned, i.e., no lateral misalignments exist between the second and the third waveguide. The thicknesses of both cores 2,3 remain substantially unchanged along the transformer 100 according to the present example (i.e., $T_2 = 2.6\ \mu m$ and $T_3 = 150\ nm$).

In this Example, the dimensions of the cores at the first cross section of FIG. 5a are $W_{3IN} = 100\ nm$ corresponding to the width of the taper tip realized in the Si waveguide, and $W_{2IN2} = T_2 = 2.6\ \mu m$. The first section of the overlapping region has a length $L_1$ equal to 500 μm. At the second cross section of FIG. 5b, the third core 3 has an intermediate width $W_{3MIDDLE} = 200\ nm$, and the second core 2 is at its smallest width $W_{2MIDDLE} = 1.2\ \mu m$, which remains constant till the end of the overlapping region. The tapered region in the Si core terminates with the guiding width $W_{3OUT} = 500\ nm$ that remains constant in the portion of the waveguides that extends after the coupling region. The length $L_2$ of the second section of the overlapping region is equal to 500 μm, which gives a total length L of the tapered region in the Si core of 1000 μm.

The first waveguide 1 is waveguide having a $SiO_2$:Ge core 1 with $n_{first\ core} = 1.462$ and $\Delta n_1 = 1.1\%$. The first waveguide cladding has $n_{cladding} = 1.446$. The thickness $T_1$ of the first waveguide core 1 is constant and equal to 3.5 μm.

With reference to the top view of FIG. 2 and cross sections of FIGS. 3a-3d, the dimensions of the first waveguide core 1 and of the second waveguide core 2 are as follows:
$W_{1IN}$=the taper tip width of the tapered region 26 of the first waveguide core=1.5 μm
$W_{1MIDDLE}$=maximum width of the first waveguide core=3.5 μm
$W_{1OUT}$=taper tip width of the tapered region 25 of the first waveguide core=3.5 μm (in this case no tapered region 25 is realized, from the end of the first tapered region 26 to the end 31 of the waveguide, the first waveguide core width $W_{1MIDDLE}$ remains constant).

The second waveguide core 2 has $W_{2IN}$=tip width of taper 24=1.25 μm

The second waveguide core then enlarges to the propagating width $W_{2IN2} = 2.6\ \mu m$ where is has a square cross section.

Figure 12C:
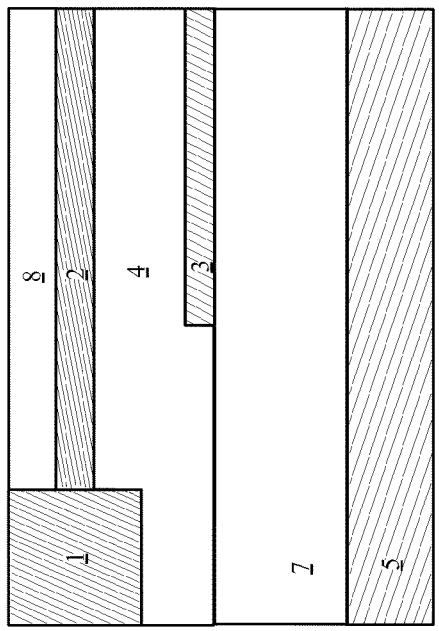
FIGS. 12a-12d show fabrication steps for the realization of the transformer of FIG. 1.
Figure 12D:
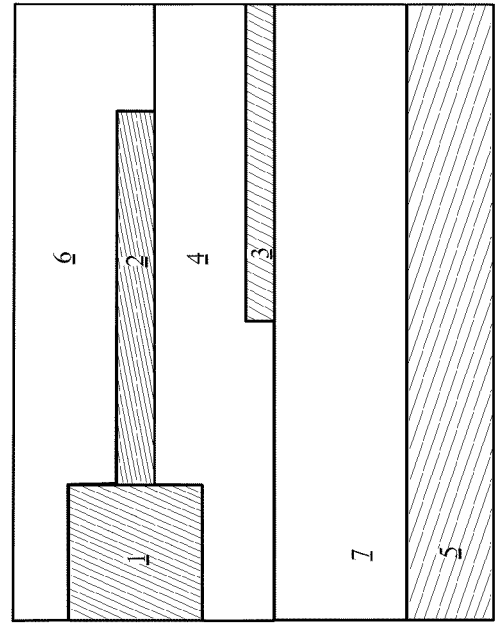
Figure 12A:
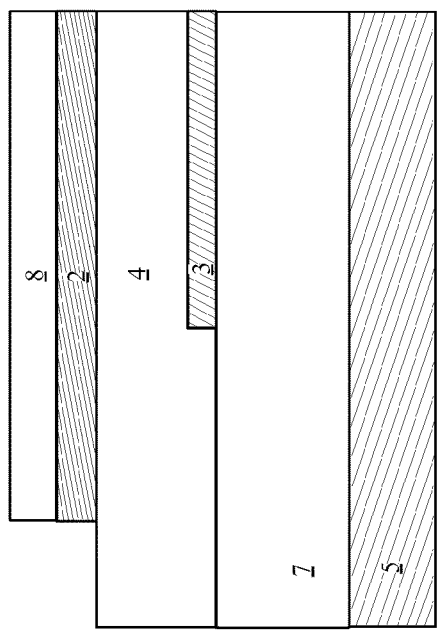
Figure 12B:
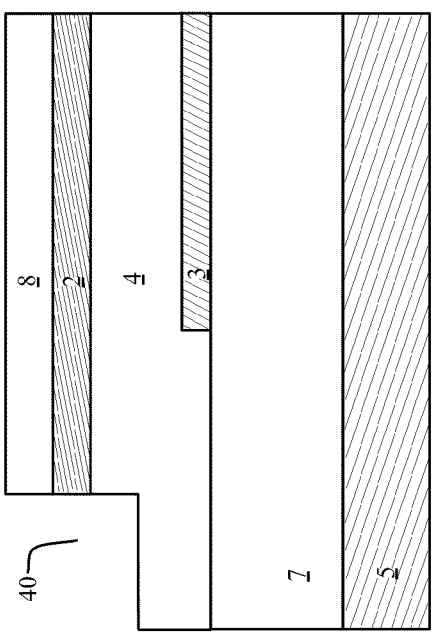

The main steps for the realization of the transformer of Example 1 are described with reference to FIGS. 12a to 12d. A commercially available SOI structure includes the substrate wafer 5, the buffer layer 7 (e.g., $SiO_2$), and a top Si layer of 150 nm. The Si film is subsequently patterned by using e-beam lithography. A TEOS (n=1.446 at 1550 nm) upper cladding layer 4 is deposited above the patterned Si core 3 by Atmospheric Chemical Vapour Deposition (APCVD). The resulting TEOS surface is thus planarized according to known techniques. A $SiO_2$:Ge layer 2 and a boron phosphorous-doped TEOS (BP-TEOS) cladding layer 8 are then deposited using Plasma Enhanced Chemical Vapor Deposition (PECVD) (FIG. 12a). A trench 40 in the TEOS cladding 4 is defined by removing a portion of the layers 8, 2 and 4 (FIG. 12b), for instance by reactive-ion etching (RIE). The material forming the core layer 1 of the first waveguide 1a is then deposited by PECVD and then selectively removed, so that it remains only within the defined trench 40 (not shown). The layers forming the core of the first waveguide and part of the cladding of the second waveguide are simultaneously etched (FIG. 12c) down to a level that defines the thickness of the first waveguide core 1 by using optical lithography. Preferably, within the same etching step, patterning of the first and second core in the (X,Y) plane is also performed. A BP-TEOS top cladding 6 is then deposited to bury the first and second waveguide core 1, 2 (FIG. 12d). The result is the transformer 100 shown in FIG. 1.

Figures 8A, 8B:
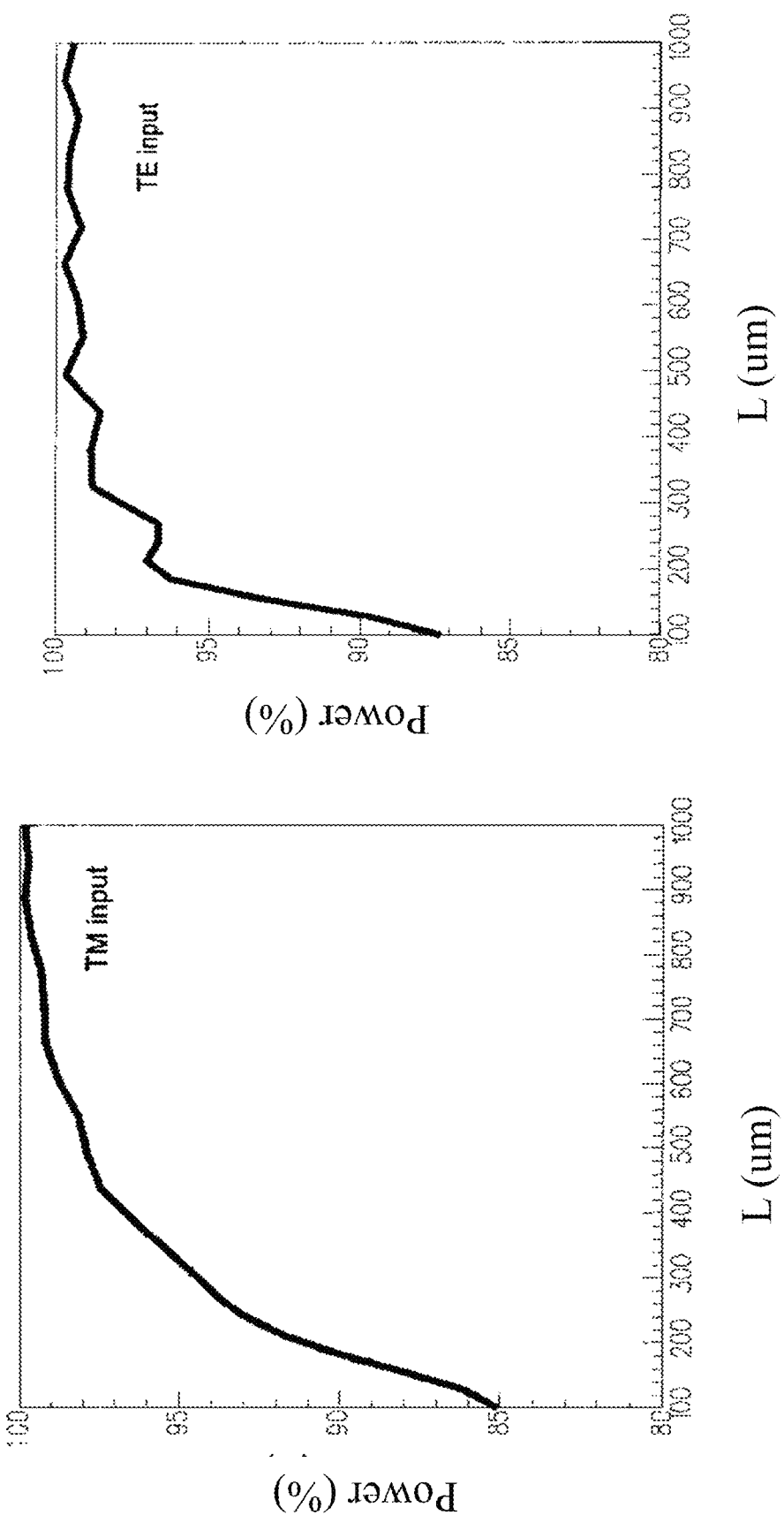
FIGS. 8a and 8b are graphs showing the behaviour of the normalized power transfer of the TM and TE polarization modes as input signals in the mode transformer of FIG. 1 as a function of the taper length of the third waveguide core.

The coupling efficiency of the transformer 100 according to Example 1 is shown in the graphs of FIGS. 8a and 8b, in which the normalized power transfer of a TM/TE mode (FIG. 8a and FIG. 8b, respectively) imputed in the second waveguide 2a and coupled into the third waveguide 3a is shown versus the length L of the tapered region of the Si core. Each graph represents the percentage of TM(TE) mode power present in the third waveguide core. From the two figures, it can be deduced that both TE and TM polarizations are efficiently transferred from the second to the third waveguide core: already at a taper length of 500 µm, more than 95% of the TE and TM polarization modes power is transferred to the Si core. It is observed that the first optical coupling between the first and second waveguide 1a,2a (butt coupling) has generally negligible effects on the mode polarization.

Figure 9:
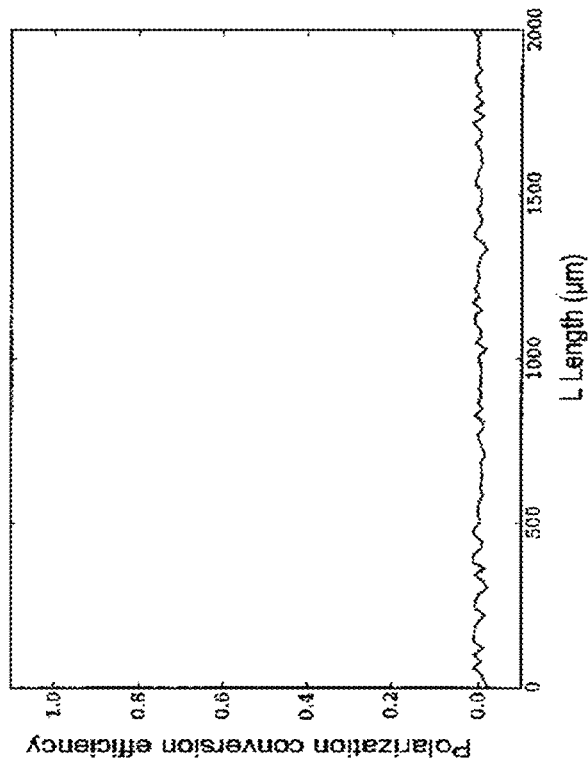
FIG. 9 is a graph of the polarization conversion efficiency versus the taper length of the second waveguide core for the transformer of FIG. 1.

The transformer 100 according to Example 1 is polarization-preserving, as clearly shown in the graph of FIG. 9. The polarization conversion efficiency of the TE mode, $\eta_{EM}$, and of the TM mode, $\eta_{ME}$, are defined as $$\eta_{EM}(L_t) = \frac{P_{TE}}{P_{TM} + P_{TE}}, \quad \eta_{ME}(L_t) = \frac{P_{TM}}{P_{TM} + P_{TE}},$$

where $P_{TE}$ and $P_{TM}$ are the optical powers at the output of the coupling region of the TE and TM polarization modes, respectively. The polarization conversion efficiency of the TE and TM modes remains substantially equal to zero for any length of the coupling region between 0 µm and 2000 µm implying that an input TM mode emerges as TM mode at the transformer output and an input TE mode emerges as TE mode, for all taper lengths L of particular interest.

Applicants have founds that the transformer according to the first or the second preferred embodiment of the invention preserves the polarization of the travelling optical modes.

EXAMPLE 2

The transformer of the second example is a transformer identical to the transformer of Example 1, with the exception of the second core dimensions.

In detail, referring back to FIGS. 5a and 5b, the dimensions of the cores of the transformer in this Example 2 are the following. The guiding portion of the second waveguide core 2 has a constant cross section of 3.6 µm×1.5 µm, leading therefore to an input width at the cross section represented in FIG. 5a of $W_{2IN2}$=3.6 µm for the second waveguide, while the width of the third waveguide core is, as in Example 1, $W_{3IN}$=100 nm. The gap between the two cores is still of 1.2 µm. At the end of the first section, having $L_1$ equal to 500 µm, i.e., at the position depicted in the second cross section of FIG. 5b, the third core 3 has an intermediate width $W_{3MIDDLE}$=200 nm, and the second core 2 is at its smallest width $W_{2MIDDLE}$=1.2 µm, which remains constant till the end of the overlapping region. At the output, i.e., at the end of the second section having $L_2$=500 µm, the Si core tapered region 13' terminates with the guiding width $W_{3OUT}$=500 nm that remains constant outside the overlapping region, while $W_{2OUT}$=1.2 µm.

The simulated performances of the transformer realized according to this second Example do not substantially differ from the ones of the transformer 100 realized according to Example 1.

In the transformer according to the first or the second preferred embodiments, which are polarization preserving, lateral misalignments may however lead to some polarization mixing, due to the broken symmetry in the cross sectional plane. Applicants have observed that for lateral misalignments up to 2 µm, i.e., for distances between the second and the third waveguide main core axes in the direction perpendicular to the mode propagating direction up to 2 µm, the performances of the transformer of the invention do not substantially changes with respect to the case such a lateral misalignment is not present, as exemplified in the following example.

EXAMPLE 3

Figure 10:
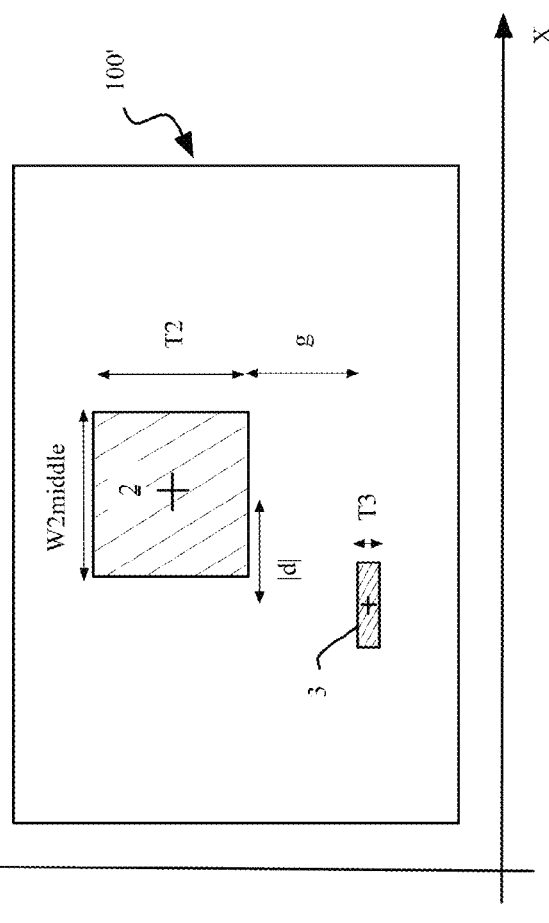
FIG. 10 is a lateral cross sectional view of a variant of the transformer of FIG. 1.

The same structure of Example 1 has been realized (same materials and waveguide dimensions), however second and third waveguides have 1 µm lateral misalignment. This embodiment is shown in the cross section FIG. 10, where the geometrical axes of the second and third waveguide core are schematically identified with a dot. The transformer is globally indicated with 100'. A 1 µm lateral misalignment stands for a distance along the X direction between the two waveguides core axes of d=1 µm.

Numerical computer simulations have shown that polarization mixing takes place only to a minor extent in the transformer 100' realized according to Example 3. The observed polarization coupling is limited to the amount of 20% and it is reversible, i.e., after a given propagating distance within the waveguide, the polarization state of the travelling mode "returns" to its input polarization at the entrance of the transformer. At the output of the tapered region of the third waveguide core, the optical mode will emerge with the same polarization launched in the first waveguide. In addition, polarization mixing takes place mainly in the second waveguide, so that its impact on the polarization-dependent loss and the polarization mode dispersion is substantially negligible.

Figure 11:
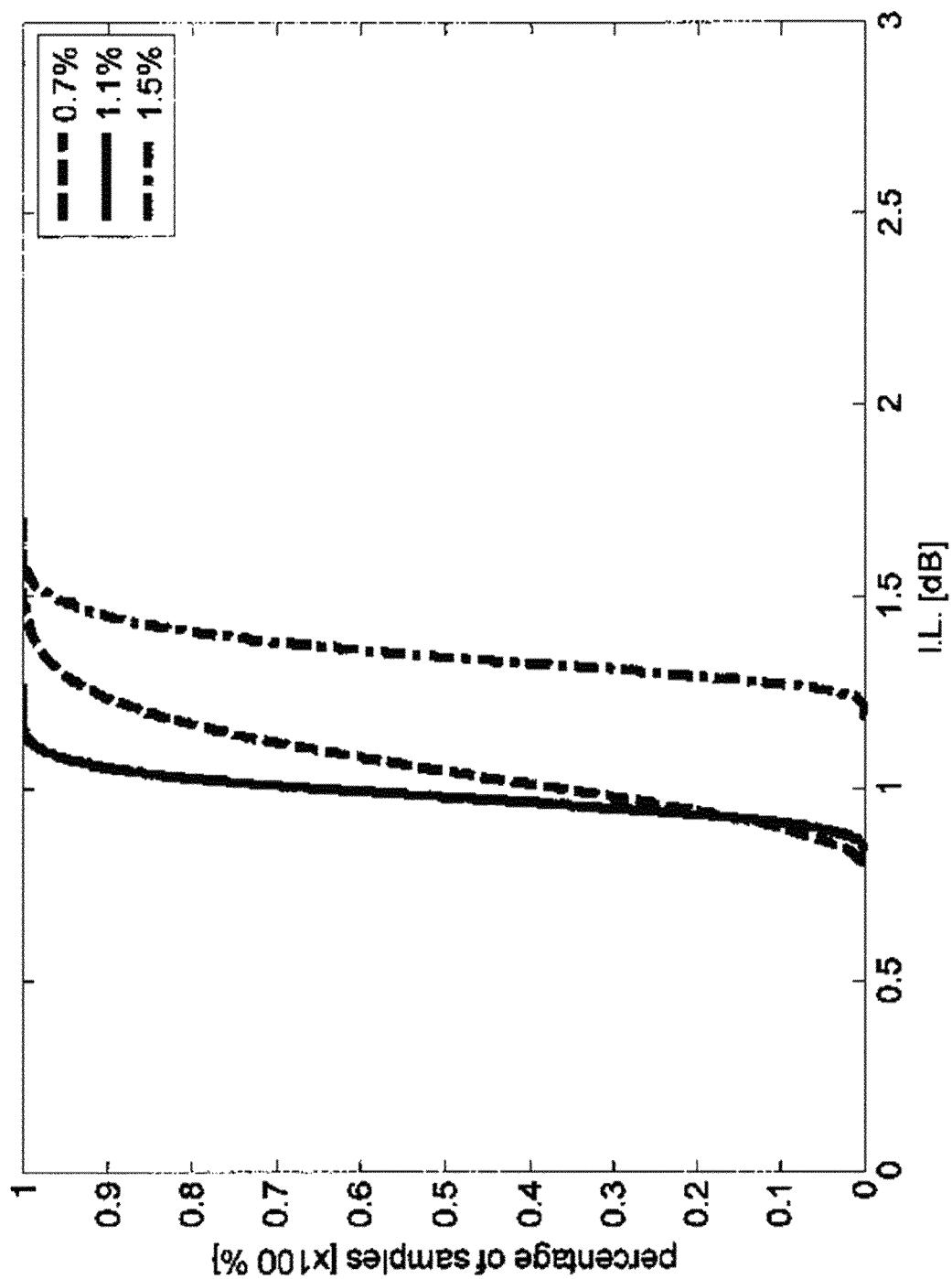
FIG. 11 is a graph showing the yield as a function of the insertion losses for two facets of the transformer of FIG. 1.

Applicants have calculated the overall losses of several samples of transformers having a structure as that described with reference to FIG. 1 according to the first embodiment of the invention. The results are depicted in FIG. 11. The overall insertion losses of the transformer 100 are the total losses of the device for both polarizations (TE/TM) and for two facets, considering a mode inputted from the SM fiber and outputted from the Si waveguide core. In order to simulate and to compute the production yield, several parameters of the transformer described in the Example 1 have been changed from one sample to the other, such as the taper tip width of the second or third waveguide cores, $W_{2IN2}$, $W_{1IN}$, $W_{1OUT}$, the thickness and width of the first waveguide. In this field, a production yield greater than 90%, preferably greater than 95%, is considered to be acceptable for the typical applications where the transformer of the invention is to be used. As visible from FIG. 11, the best yield is achieved when a waveguide with $\Delta n$=1.1% is used as a first waveguide 1a (solid curve). In this case, most (99%) of the samples has overall insertion losses lower than 1.2 dB per two facets. If a waveguide with $\Delta n$=1.5% is used as a first waveguide, the losses are 1.5 dB for two facets with 95% yield (dot dashed curve), and if a waveguide with $\Delta n$=0.7% is used as a first waveguide, the yield has the value of 95% when the losses are 1.1 dB for two facets (dashed curve). The index contrasts of the second and third waveguide are taken to be $\Delta n_2$=2.5% and $\Delta n_3$=40%, respectively. The transformers according to the present invention can be integrated in several integrated optical devices or sub-systems, such as tunable optical add drop multiplexers, tunable optical filters, modulators, grating filters, sensors, etc.

The invention claimed is:

1. An optical mode transformer comprising:
a first waveguide extending along a first main longitudinal direction and having a first end including an end facet configured to be coupled to an optical fiber, the first waveguide including a first core and a first cladding, and having a first refractive index contrast;
a second waveguide comprising a second core and a second cladding, and having a second refractive index contrast, an end of the second waveguide being butt coupled to a second end of the first waveguide; and
a third waveguide being arranged with respect to the second waveguide so as to realize an evanescent optical coupling with the second waveguide, the third waveguide comprising a third core and a third cladding, and having a third refractive index contrast, the third core including a tapered region in at least a portion of which the evanescent coupling takes placed; and
wherein the first refractive index contrast is less than the second refractive index contrast, the second refractive index contrast is less than the third refractive index contrast, and the third refractive index contrast is not less than 18%.

2. The mode transformer according to claim 1, wherein the second core comprises a tapered region in at least a portion of which the evanescent coupling takes place with the third waveguide.

3. The mode transformer according to claim 1, wherein the second core and the third core are separated by a gap in a direction substantially perpendicular to the first main longitudinal direction.

4. The mode transformer according to claim 3, wherein the gap has a substantially uniform height.

5. The mode transformer according to claim 3 further comprising a micro-heater disposed between the second core and the third core.

6. The mode transformer according to claim 1, wherein the first core and the second core are separated by a gap along the first main longitudinal direction.

7. The mode transformer according to claim 1, wherein the second core and the third core at least partially overlap along the first main longitudinal direction to form an overlapping region.

8. The mode transformer according to claim 7 wherein a length of a side of the third core is less than or equal to 80 percent of a length of another side of the third core in the overlapping region, and both the side of the third core and the another side of the third core being located in the overlapping region and being perpendicular to the first main longitudinal direction.

9. The mode transformer according to claim 7, wherein a tapered region of the second core and at least a portion of the tapered region of the third core are disposed within the overlapping region.

10. The mode transformer according to claim 9, wherein a constant width section of the second core is additionally disposed within the overlapping region.

11. The mode transformer according to claim 9, wherein the tapered region of the third core and the tapered region of the second core are tapered in opposite directions.

12. The mode transformer according to claim 1, wherein the third refractive index contrast is greater than 40%.

13. The mode transformer according to claim 12, wherein a refractive index of the third core is greater than 3.

14. The mode transformer according to claim 12, wherein the second core and the third core are separated by a gap in a direction substantially perpendicular to the first main longitudinal direction and the gap is between 0.1 μm and 3 μm.

15. The mode transformer according to claim 1, wherein the third refractive index contrast is between 18% and 30%.

16. The mode transformer according to claim 15, wherein a refractive index of the third core is greater than 1.8 and less than 2.4.

17. The mode transformer according to claim 15, wherein the third core comprises a wide bandgap semiconductor.

18. The mode transformer according to claim 15, wherein the second core and the third core are separated by a gap in a direction substantially perpendicular to the first main longitudinal direction and the gap is between 0.1 μm and 5 μm.

19. The mode transformer according to claim 1 wherein the first core includes a first tapered region.

20. The mode transformer according to claim 19 wherein the first tapered region of the first core and a second tapered region of the first core are tapered in opposite directions.

* * * * *